(12) United States Patent
Cheng

(10) Patent No.: US 12,454,025 B2
(45) Date of Patent: Oct. 28, 2025

(54) METHOD AND SYSTEM FOR JOINING METAL WORKPIECES TO PROVIDE A WORKPIECE ASSEMBLY

(71) Applicant: Paul Po Cheng, London (CA)

(72) Inventor: Paul Po Cheng, London (CA)

(*) Notice: Subject to any disclaimer, the term of this patent is extended or adjusted under 35 U.S.C. 154(b) by 145 days.

(21) Appl. No.: 18/278,108

(22) PCT Filed: Feb. 23, 2022

(86) PCT No.: PCT/CA2022/050255
§ 371 (c)(1),
(2) Date: Aug. 21, 2023

(87) PCT Pub. No.: WO2022/178627
PCT Pub. Date: Sep. 1, 2022

(65) Prior Publication Data
US 2024/0131616 A1 Apr. 25, 2024
US 2024/0227064 A9 Jul. 11, 2024

Related U.S. Application Data

(60) Provisional application No. 63/152,989, filed on Feb. 24, 2021.

(51) Int. Cl.
*B23K 20/00* (2006.01)
*B23K 20/14* (2006.01)
(Continued)

(52) U.S. Cl.
CPC .............. *B23K 20/16* (2013.01); *B23K 20/14* (2013.01); *B23K 20/24* (2013.01); *B23K 20/26* (2013.01)

(58) Field of Classification Search
CPC .. B23K 20/12; B23K 2101/06; B23K 13/015; B23K 20/129; B23K 20/24;
(Continued)

(56) References Cited

U.S. PATENT DOCUMENTS 9,644,769 B1 5/2017 Cheng
2014/0191016 A1 7/2014 Lehr
(Continued)

OTHER PUBLICATIONS

International Search report for the corresponding International Application PCT/CA2022/050255 dated May 10, 2022.

*Primary Examiner* — Erin B Saad
(74) *Attorney, Agent, or Firm* — Gowling WLG (Canada) LLP

(57) ABSTRACT

A method and a system of forming a workpiece assembly including an intermediate element between first and second workpieces. A ring element is included in or on the intermediate element. The ring element is for rotating the intermediate element about the intermediate elements axis. With heating elements positioned between the intermediate element and the first and second ends of the first and second workpieces, portions of the intermediate element and the first and second workpieces are heated to a predetermined hot working temperature, in an inert (non-oxidizing) atmosphere. While the heated portions are at the predetermined hot working temperature, and while the intermediate element is rotated about its axis, one or both of the first and second workpieces are moved axially, to engage the first and second ends with the intermediate element.

9 Claims, 20 Drawing Sheets

(51) Int. Cl.
 B23K 20/16 (2006.01)
 B23K 20/24 (2006.01)
 B23K 20/26 (2006.01)

(58) Field of Classification Search
 CPC ............... B23K 2101/10; B23K 20/16; B23K 37/0533; B23K 13/025; B23K 20/002; B23K 20/1205; B23K 20/26; B23K 20/028; F16L 13/02
 See application file for complete search history.

(56) References Cited

U.S. PATENT DOCUMENTS

| 2021/0053143 | A1* | 2/2021 | Cheng | .................... F16L 13/02 |
| 2022/0040782 | A1* | 2/2022 | Cheng | .................... B23K 20/12 |
| 2024/0101291 | A1* | 3/2024 | Cheng | .................... B65B 7/285 |
| 2024/0149364 | A1* | 5/2024 | Cheng | ................. B23K 13/015 |

* cited by examiner

METHOD AND SYSTEM FOR JOINING METAL WORKPIECES TO PROVIDE A WORKPIECE ASSEMBLY

CROSS-REFERENCE TO RELATED APPLICATION

This application is a US National Phase Application of International Patent Application No. PCT/CA2022/050255, filed on Feb. 23, 2022, which claims the benefit of U.S. Provisional Patent Application No. 63/152,989, filed on Feb. 24, 2021, both of which are hereby incorporated herein by reference in their entirety.

FIELD OF THE INVENTION

The present invention is a method of joining metal workpieces to provide a workpiece assembly.

BACKGROUND OF THE INVENTION

In the prior art, metal workpieces may be fused together in various ways, e.g., as described in U.S. Pat. No. 6,637,642. However, in circumstances where the space in which the workpieces are to be fused together is limited, the method and system disclosed in U.S. Pat. No. 6,637,642 may not be suitable.

SUMMARY OF THE INVENTION

For the foregoing reasons, there is a need for a system and a method that overcomes or mitigates one or more of the defects or disadvantages of the prior art.

In its broad aspect, the invention provides a method in which an intermediate element is positioned between first and second ends of first and second workpieces respectively. A ring element is included in or on the intermediate element. The ring element is used to rotate the intermediate element about the intermediate element's axis.

With heating elements positioned between the intermediate element and the first and second ends of the first and second workpieces, portions of the intermediate element and the first and second workpieces are heated to a predetermined hot working temperature, in an inert (non-oxidizing) atmosphere. While the heated portions are at the predetermined hot working temperature, and while the intermediate element is rotated about its axis, the first and second workpieces are moved axially, to engage the first and second ends with the intermediate element. Alternatively, the first and second ends may be engaged with the intermediate element before the intermediate element is rotated.

The rotation of the intermediate element while the first and second ends are engaged with it result in at least part of the heated portions being subjected to plastic deformation, so that the material in the heated portions is subjected to shear stresses. This causes recrystallization of the material, with the result that the microstructure of such material is generally uniform and fine-grained. The first and second workpieces and the intermediate element therebetween are fused together to form a workpiece assembly. The workpiece assembly does not exhibit regions or softness or weakness (e.g., associated with heat-affected zones) that are characteristic of the conventional techniques.

BRIEF DESCRIPTION OF THE DRAWINGS

The invention will be better understood with reference to the attached drawings, in which:

FIG. 100 is a cross-section of another alternative embodiment of the intermediate element of the invention, and of the workpieces, drawn at a larger scale;

DETAILED DESCRIPTION

Figure 1:
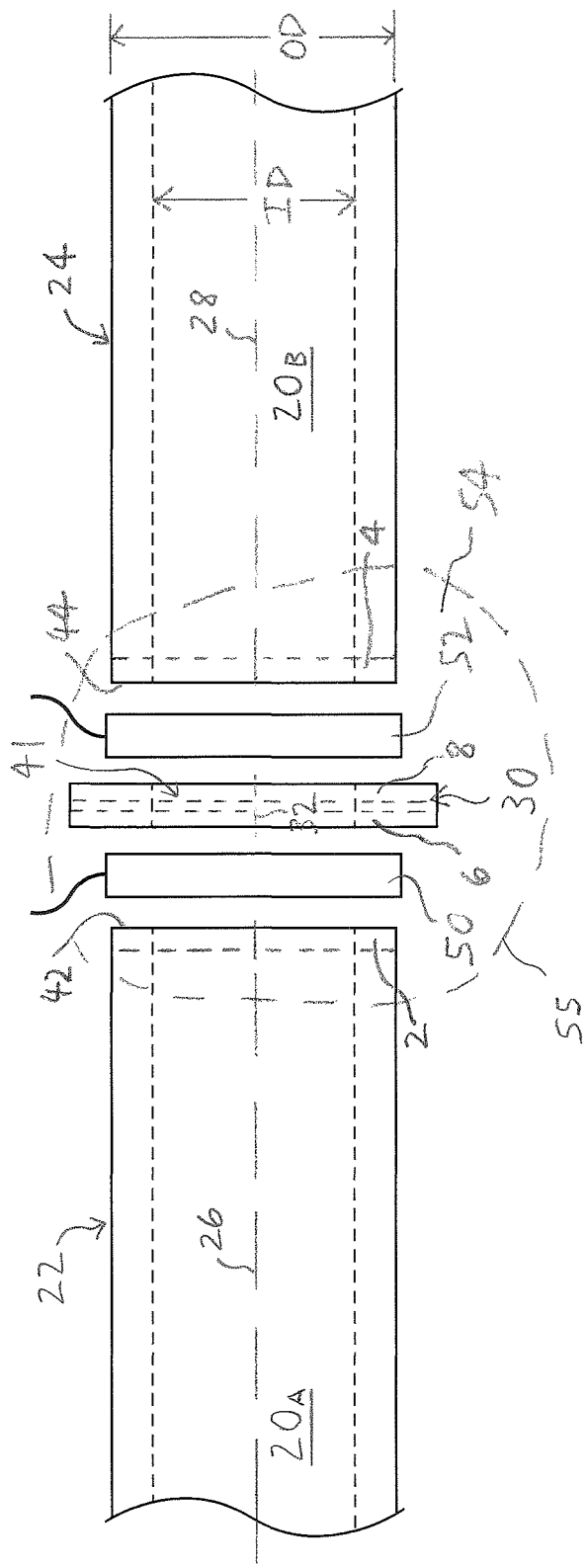
FIG. 1 is a side view of two workpieces with an embodiment of an intermediate element located therebetween, and heating elements located between the workpieces and the intermediate element.

In the attached drawings, like reference numerals designate corresponding elements throughout. The invention includes a method of joining first and second metal workpieces 22, 24 to form a workpiece assembly 25 (FIG. 3), as will be described. As can be seen in FIG. 1, the first and second workpieces 22, 24 preferably are partially defined by respective longitudinal axes 26, 28 thereof.

Figure 2:
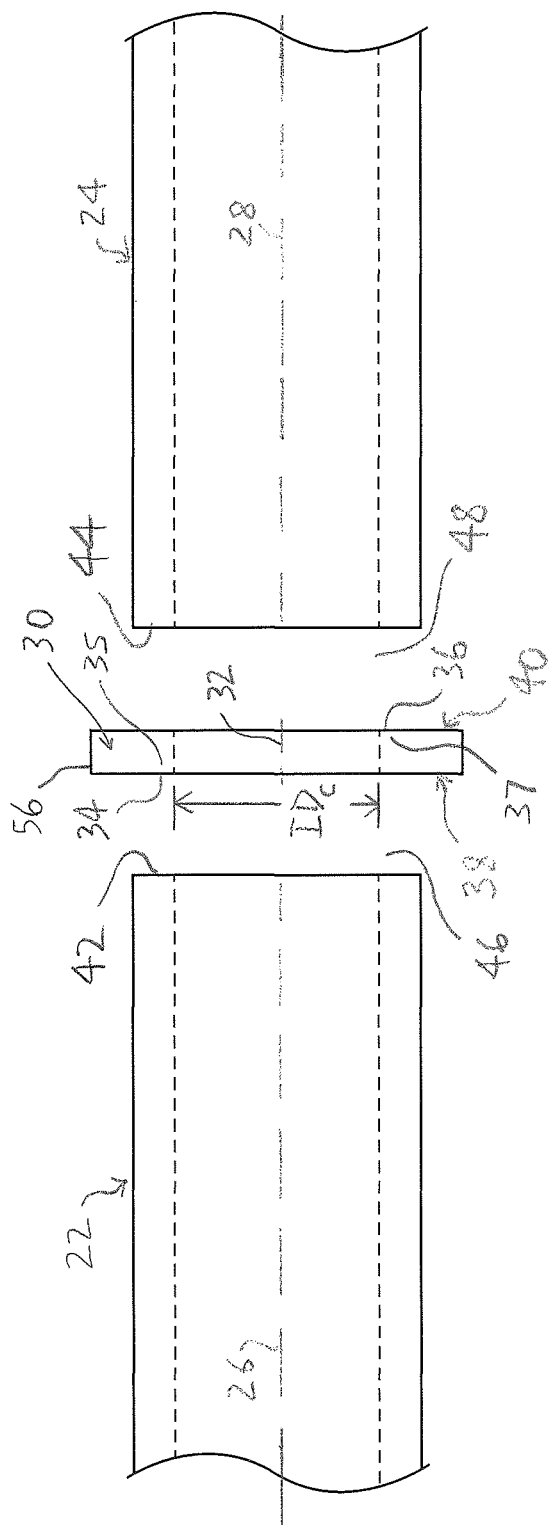
FIG. 2 is a side view of the workpieces and the intermediate element of FIG. 1 in which the heating elements of FIG. 1 have been removed.
Figure 3:
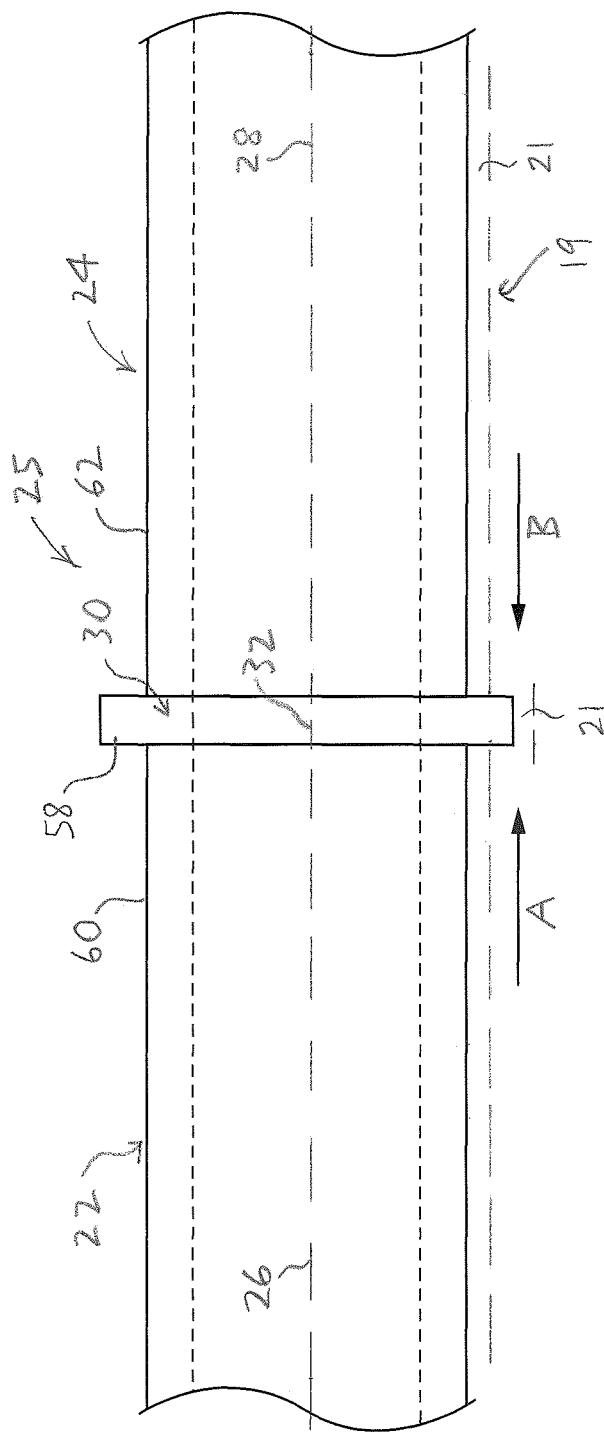
FIG. 3 is a side view of the workpieces and the intermediate element of FIGS. 1 and 2 showing the workpieces engaged with the intermediate element, on opposite side thereof.

An intermediate element 30, which is also a metal workpiece, preferably is provided that is partially defined by an intermediate element axis 32 thereof (FIGS. 1-3). As will also be described, the intermediate element 30 preferably has first and second contact surfaces 34, 36 on opposed first and second sides 38, 40 thereof respectively (FIG. 2).

It will be understood that the first and second workpieces 22, 24 may have any suitable configuration. In the examples illustrated in FIGS. 1-5, the first and second workpieces 22, 24 are pipe or tubes. Each pipe has an inner diameter "ID" defining an open conduit $20_A$, $20_B$ therethrough, and an outer diameter "OD". As can be seen, e.g., in FIG. 2, the intermediate element 30 also is a pipe, and has an inner diameter "$ID_C$" equal to the inner diameter "ID" of the pipes 22, 24 (FIG. 2). The inner diameter "$ID_C$" defines an intermediate conduit 41 in the intermediate element 30.

As can be seen in FIG. 2, the first and second workpieces 22, 24 have respective first and second ends 42, 44 thereof. Preferably, the first and second workpieces 22, 24 are positioned coaxially to locate the first and second ends 42, 44 facing each other, and spaced apart from each other to define an opening between the first and second ends 42, 44.

In one embodiment, the intermediate element 30 preferably is located in the opening to position the first and second sides 38, 40 of the intermediate element 30 facing the first and second ends 42, 44 respectively (FIG. 2). It is preferred that the intermediate element 30 is located coaxial with the first and second workpieces 22, 24 (FIGS. 1, 2). Accordingly, when the intermediate element 30 is coaxial with the first and second workpieces 22, 24, the intermediate conduit 41 is aligned with the conduits $20_A$, $20_B$.

The first contact surface 34 and the first end 42 define a first gap 46 therebetween. The second contact surface 36 and the second end 44 define a second gap 48 therebetween. First and second heating elements 50, 52 preferably are positioned in the first and second gaps 46, 48 respectively (FIG. 1).

In one embodiment, one or more non-oxidizing (inert) atmospheres preferably are provided in in the first and second gaps 46, 48, to cover or envelope the first and second ends 42, 44 and the first and second contact surfaces 34, 36 of the intermediate element 30. Those skilled in the art would be aware of the manner in which the non-oxidizing atmospheres may be created and maintained. As an example, a region 54 in which a non-oxidizing (or inert) atmosphere is maintained is schematically illustrated in FIG. 1. Those skilled in the art would also appreciate that the non-oxidizing atmosphere may be held in place in the region 54 inside a cover 55 that is schematically illustrated in FIG. 1.

Once they are in position in the first and second gaps 46, 48 and the non-oxidizing atmosphere is present, the first and second heating elements 50, 52 are energized. The first end 42 and a first length portion 2 of the first workpiece 22 that extends from the first end 42 into the first workpiece 22 are heated to a predetermined hot working temperature in the non-oxidizing atmosphere by the first heating element 50. The second end 44 and a second length portion 4 of the second workpiece 24 that extends from the second end 44 into the second workpiece 24 are heated to the predetermined hot working temperature in the non-oxidizing atmosphere by the second heating element 52.

In addition, when the first heating element 50 is energized, it heats the first contact surface 34 (FIG. 2) and a first intermediate element portion 6 (FIG. 1) that extends from the first contact surface 34 into the intermediate element 30 to the predetermined hot working temperature. When the second heating element 52 is energized, it heats the second contact surface 36 (FIG. 2) and a second intermediate element portion 8 (FIG. 1) that extends from the second contact surface 36 into the intermediate element 30 to the predetermined hot working temperature.

It will be understood that the predetermined hot working temperature is a temperature at which the metal of the first and second workpieces 22, 24 and the intermediate element 30 is plastically deformable. Those skilled in the art would be aware that hot working may take place for most metals over a range of temperatures below the melting temperature thereof. The predetermined hot working temperature is a selected temperature within the range of hot working temperatures for the metal of the first and second workpieces and the intermediate element. The intermediate element may be used between first and second workpieces made of different metals, as will be described.

Preferably, the first and second heating elements 50, 52 are energized simultaneously, or substantially simultaneously. When the predetermined hot working temperature has been reached, the first and second heating elements 50, 52 preferably are removed from the first and second gaps 46, 48. It will be understood that in FIG. 2, the first and second workpieces 22, 24 and the intermediate element 30 are illustrated at the point when the first and second heating elements 50, 52 are removed.

In one embodiment, the intermediate element 30 preferably is rotated about the intermediate element axis 32. The mechanism used to rotate the intermediate element 30 about the intermediate element axis 32 may be any suitable mechanism, as will be described. It will be understood that the intermediate element 30 may be rotated about the intermediate element axis 32 before the heating elements 50, 52 are removed from the first and second gaps 46, 48, or after.

The first length portion 2 is the portion of the first workpiece 22, extending from the first end 42 into the first workpiece 22, that is heated to the predetermined hot working temperature. The second length portion 4 is the portion of the second workpiece 24, extending from the second end 44 into the second workpiece 24, that is heated to the predetermined hot working temperature.

The first and second intermediate element portions 6, 8 also are the portions of the intermediate element 30, extending inwardly from the first and second contact surfaces 34, 36 respectively, that are heated to the predetermined hot working temperature As illustrated in FIG. 1, the length portions 2, 4, 6, and 8 end at uniform distances from the heating elements. However, FIG. 1 is only one example of the manner in which the first and second workpieces 22, 24 and the intermediate element 30 may be heated. It will be understood that, depending on the shapes of the workpieces 22, 24, and depending on the shapes and the functional aspects of the heating elements, each of the first and second length portions 2, 4 may not extend the same distance from the first and second ends 42, 44 respectively.

While the intermediate element 30 is rotating about the intermediate element axis 32, and while the first ends 42, the first length portion 2, the first contact surface 34, and the first intermediate element portion 6 are at the predetermined hot working temperature, the first end 42 is engaged with the first contact surface 34 for plastic deformation of at least parts of the first end 42, the first length portion 2, the first contact surface 34, and the first intermediate element portion 2. Also, while the second end 44, the second length portion 4, the second contact surface 36, and the second intermediate element portion 8 are at the predetermined hot working temperature, the second end 44 is engaged with the second contact surface 36, for plastic deformation of at least parts of the second end 42, the second length portion 4, the second contact surface 36, and the second intermediate element portion 8. The first end 42, the first length portion 2, the first contact surface 34, the first intermediate element portion 6, the second end 44, the second length portion 4, the second contact surface 36, and the second intermediate element portion are sometimes herein collectively or separately referred to as the "heated portions".

Those skilled in the art would appreciate that the intermediate element 30 is rotated and the first and second ends 42, 44 are engaged with the rotating intermediate element 30 when the heated portions of the elements that are engaged are at the predetermined hot working temperature. In practice, this means that the removal of the heating elements and the engagement of the intermediate element and the first and second ends is required to take place relatively quickly, i.e., before the parts that are engaged cool to a temperature below the predetermined hot working temperature.

It will be understood that, for a very short period of time after the first and second ends 42, 44 engage the first and second contact surfaces 34, 36, the intermediate element 30 continues to rotate about the intermediate element axis 32. At least parts of the first and second ends 42, 44, the first and second length portions 2, 4, the first and second contact surfaces 34, 36, and the first and second intermediate element portions 6, 8 undergo plastic deformation because of the engagement of the first and second ends 42, 44 with the first and second contact surfaces 34, 36 while the intermediate element 30 continues to rotate about the intermediate element axis 32. However, the plastic deformation can only take place while the heated portions of the workpieces 22, 24 and the intermediate element 30 are at the hot working temperature, and plastically deformable. The intermediate element 30 stops rotating about the intermediate element axis 32 shortly after the first and second ends 42, 44 engage the first and second sides 38, 40.

It will be understood that the intermediate element's rotation preferably ceases when the resistance to rotation exceeds a predetermined upper limit of the torque applied to rotate the intermediate element 30, at which further point rotation is unlikely to achieve further plastic deformation. As noted above, the temperature of the heated portions quickly falls below the hot working temperature, and when this happens, plastic deformation of the heated portions ceases. For example, the heated portions may be subject to plastic deformation for approximately 1.0 to 1.25 seconds. Once the heated portions are at a temperature below the hot working temperature, urging further rotation would not achieve any improvement, and may damage the devices effecting the rotation. The manner in which the rotation of the intermediate element 30 may be controlled is further described below.

For example, as can be seen in FIG. 3, in one embodiment, while the intermediate element 30 rotates about the intermediate element axis 32, the first workpiece 22 preferably is moved in the direction indicated by arrow "A" to engage the first end 42 with the first contact surface 34. As can also be seen in FIG. 3, at substantially the same time, the second workpiece 24 preferably is moved in the direction indicated by arrow "B", to engage the second end 44 with the second contact surface 36. Preferably, the directions indicated by arrows "A" and "B" are coaxial with the axes 26, 28 respectively.

The rotation of the intermediate element 30 while the first and second ends 42, 44 are engaged with it results in the shearing of at least part of the material that is in the heated portions, at the predetermined hot working temperature. In practice, after the removal of the heating elements, and while the first and second ends 42, 44 are engaged with the rotating intermediate element 30, the temperature of such material rapidly falls to a temperature that is below a hot working temperature. Further plastic deformation after the material's temperature has fallen below the hot working temperature is then no longer feasible. At that point, rotation of the intermediate element 30 relative to the first and second workpieces 22, 24 ceases.

In one embodiment, after the intermediate element 30 ceases rotating, the first and second workpieces 22, 24 and the intermediate element 30 located therebetween are subsequently cooled, to bond the first and second ends 42, 44 (and the first and second length portions 2, 4) with the respective first and second contact surfaces 34, 36 (and the first and second intermediate element portions 6, 8) of the intermediate element 30. As a result, the first and second workpieces 22, 24 and the intermediate element 30 are fused together to form the workpiece assembly 25 (FIG. 3).

Once the workpiece assembly 25 has been formed, the material in the heated portions thereof that had been heated to the predetermined hot working temperature and subjected to shearing (i.e., on one side of the intermediate element 30, the first end 42, the first length portion 2, and the first contact surface 34 and the first intermediate element portion 6, and on the other side of the intermediate element 30, the second end 44, the second length portion 4, and the second contact surface 36, and the second intermediate element portion 8) has a generally uniform fine-grained microstructure. The microstructure is substantially consistent throughout the heated portions of the workpiece assembly 25 that had been heated to the predetermined hot working temperature and subjected to shearing, and there are no heat-affected zones therein, providing a uniformly strong workpiece assembly 25 throughout the part thereof in which the heated portions were located. Unlike a workpiece welded together using conventional techniques (e.g., friction welding or filler welding), the workpiece assembly 25 does not exhibit the regions of softness or weakness (e.g., associated with heat-affected zones) that are characteristics of the conventional techniques.

As can be seen in FIG. 3, once the workpiece assembly 25 has been formed, an outer portion 58 of the intermediate element 30 may extend radially outwardly, beyond respective outer surfaces 60, 62 of the first and second workpieces 22, 24. Those skilled in the art would appreciate that the outer portion 58 may be removed by a suitable finishing process after the workpiece assembly 25 has been formed. It will be understood that any parts of the material that had been plastically deformed and that extend radially outwardly beyond the outer surfaces 60, 62 may be removed by a suitable finishing process. Those skilled in the art would be aware of suitable finishing processes.

It will be understood that the intermediate element may be made of a metal that differs from the metal that the first and second workpieces are made of. Also, the first and second workpieces may be made of metals different from each other. From the foregoing, it can be seen that, in circumstances where a hot working temperature may be determined that is a suitable hot working temperature for the metals of the first and second workpieces and the intermediate element, then the method of the invention may be used to join different metals together.

In an alternative embodiment, while the heated portions are at the predetermined hot working temperature, the first and second ends 42, 44 are engaged with the first and second contact surfaces 34, 36 respectively, before the intermediate element 30 rotates about its axis 32. In this embodiment, the rotation of the intermediate element 30 about its axis 32 commences after such engagement and continues until the temperature of the heated portions falls below the predetermined hot working temperature, so that further plastic deformation of the heated portions is then not feasible.

Those skilled in the art would appreciate that, in certain circumstances, only one of the first and second workpieces 22, 24 may be movable in an axial direction. As an example, in FIG. 4, only the second workpiece 24 is movable, and the first workpiece 22 is stationary.

Figure 4:
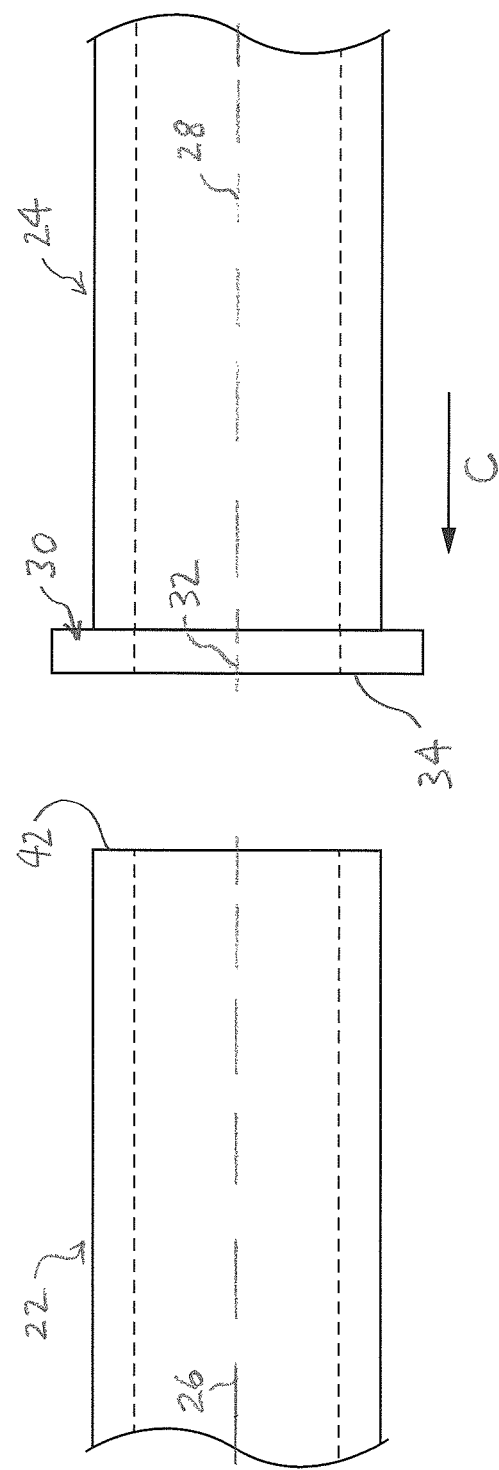
FIG. 4 is a side view of the workpieces and the intermediate element of FIGS. 1 and 2 in which only one of the workpieces engages the intermediate element.

As illustrated in FIG. 4, once the heated portions have been heated to the predetermined hot working temperature and the heating elements are removed, and preferably while the intermediate element 30 is rotating about the axis 32, the second workpiece 24 is moved in the direction indicated by arrow "C", to engage the second end 44 with the second contact surface 36 of the rotating intermediate element 30. It will be understood that the first and second heating elements and the non-oxidizing atmosphere are omitted from FIG. 4 for clarity of illustration.

While the intermediate element 30 continues to rotate about its axis, the intermediate element 30 is then pushed by the second workpiece 24 moving further in the axial direction indicated by arrow "C", to cause the first contact surface 34 to engage the first end 42.

Figure 5:
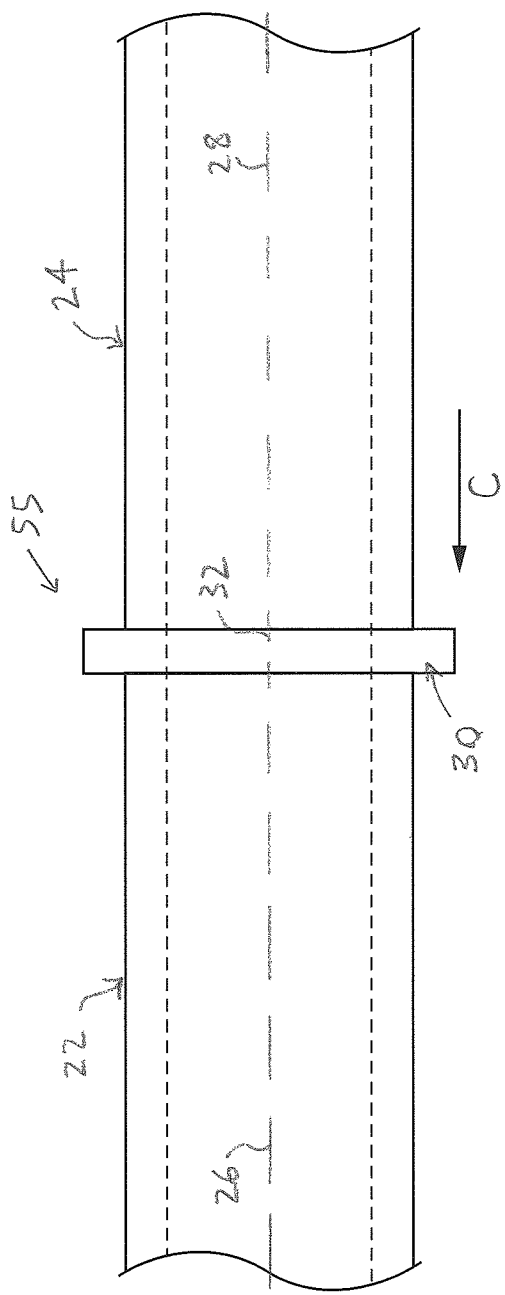
FIG. 5 is a side view of the workpieces and the intermediate element of FIG. 4 in which the workpieces are engaged with the intermediate element.

As noted above, for at least a short period of time, the intermediate element 30 rotates relative to the first and second ends 42, 44 while the intermediate element 30 is engaged with both of the first and second ends 42, 44 (FIG. 5). While the intermediate element 30 is rotating, and while the heated portions are at the predetermined hot working temperature, the second workpiece 24 is urged in the direction indicated by arrow "C" (FIG. 5), pushing against the second contact surface 36, and pushing the first contact surface 34 against the first end 42. Due to such rotation, the heated portions that are heated to the predetermined hot working temperature (i.e., on one side of the intermediate element 30, the first end 42, the first length portion 2, and the first contact surface 34 and the first intermediate element portion 6, and on the other side of the intermediate element 30, the second end 44, the second length portion 4, and the second contact surface 36 and the second intermediate element portion 8) are at least partially subjected to shearing, and plastically deformed, causing recrystallization of at least part of the material in the heated portions. As noted above, the heated portions cool to temperatures below the hot working temperature relatively quickly, resulting in a generally uniformly finely-grained microstructure throughout the material of the formerly heated portions. The material that has been plastically deformed is subjected to very little residual stress.

It will be understood that, once the heated portions cool to temperatures below the hot working temperature, the formerly heated portions on each respective side of the intermediate element 30 are fused together, and further rotation of the intermediate element 30 relative to the first and second workpieces 22, 24 is resisted to the extent that further rotation is not practical or feasible. At that point, the rotation of the intermediate element 30 ceases.

It will be understood that the workpiece assembly 25 includes the first and second workpieces 22, 24 and the intermediate element 30. From the foregoing, it can be seen that, in the workpiece assembly 25, the first workpiece 22 and the intermediate element 30 are fused together at the first side 38 of the intermediate element 30, and the second workpiece 24 and the intermediate element 30 are fused together at the second side 40.

It has been determined that, in the method of the invention, approximately 95 percent of the energy inputs are in the form of the electrical energy that is provided to the heating elements. The energy required to rotate the intermediate element 30 is estimated to represent less than 5 percent of the total energy inputs. Also, the energy required to engage the first and second workpieces 22, 24 with the intermediate element 30 is estimated to represent less than 5 percent of the total energy inputs. This means that, in comparison to other methods that may be considered (e.g., friction welding), the mechanisms required to effect rotation of the intermediate element 30 and engagement of the first and second workpieces 22, 24 with the intermediate element 30 may be smaller, and generally simpler. As a practical matter, this can be a significant advantage in circumstances in which the space available around the workpieces 22, 24 and the intermediate element 30 is limited, or in circumstances (e.g., at an installation site) where operating heavy machinery may be impractical.

Those skilled in the art would appreciate that any suitable mechanism may be utilized to rotate the intermediate element 30 about the intermediate element axis 32. It will also be understood that, preferably, any such mechanism preferably includes a means for stopping the rotation of the intermediate element 30 once the temperature of the heated portions is less than the hot working temperature and further plastic deformation is not feasible, i.e., once the workpiece assembly 25 has been formed.

As noted above, in one embodiment, the method of forming the workpiece assembly 25 preferably includes positioning the first and second workpieces 22, 24 coaxially to locate the first and second ends 42, 44 facing each other and spaced apart from each other to define the opening between the first and second ends 42, 44. The intermediate element 30 preferably is positioned in the opening to locate the first and second contact surfaces 34, 36 facing the first and second ends 42, 44 respectively, to define the first and second gaps 46, 48 therebetween respectively, the intermediate element 30 being located coaxial with the first and second workpieces 22, 24.

Figure 6A:
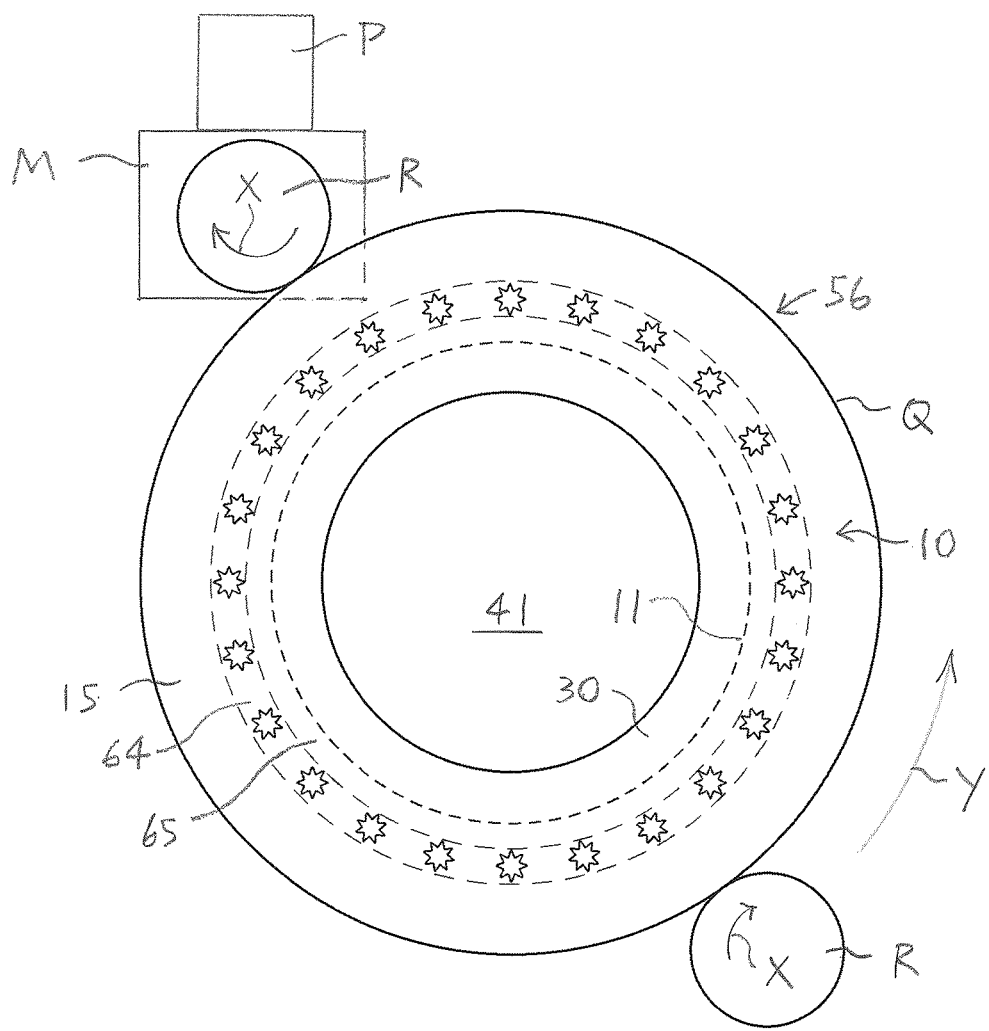
FIG. 6A is an end view of one side of an intermediate element and a ring element assembly of the invention, drawn at a larger scale.
Figure 6B:
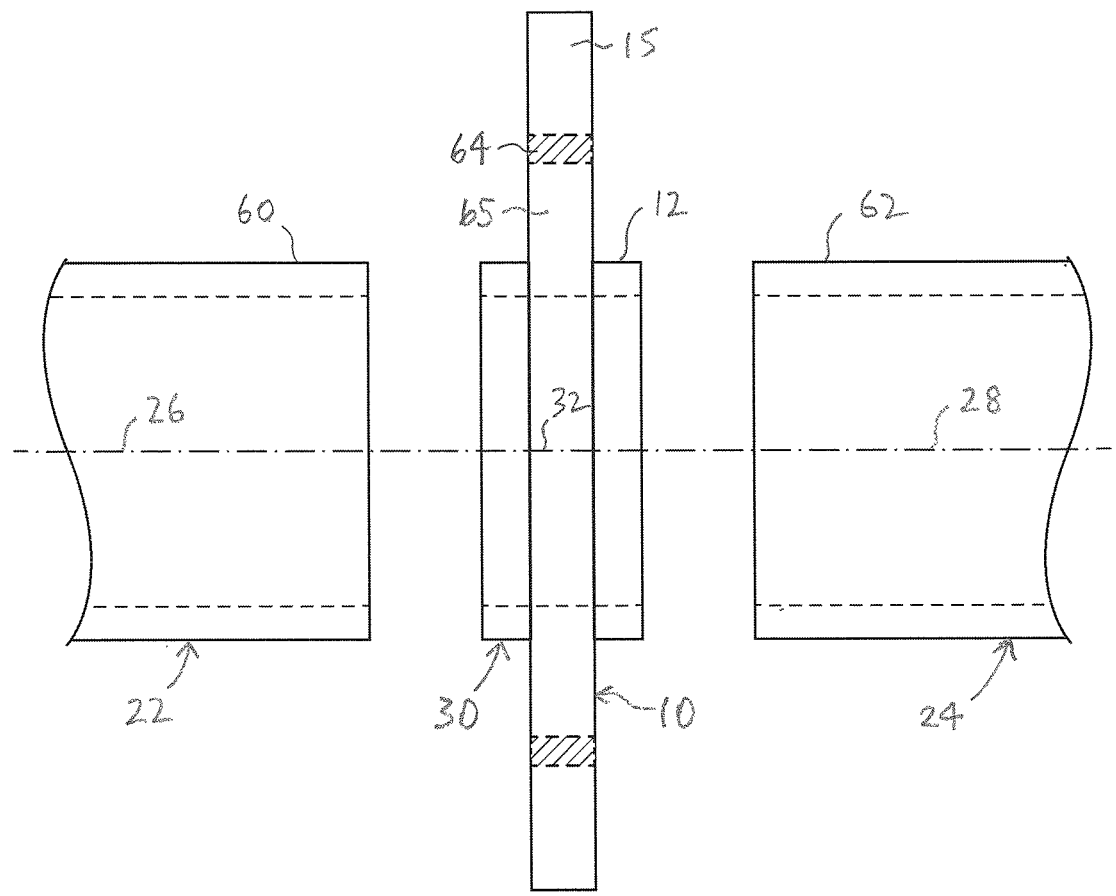
FIG. 6B is a side view of the intermediate element with an embodiment of a ring element of the invention integrally formed therewith.

As can be seen in FIGS. 6A and 6B, in one embodiment, a ring element assembly 56 is provided, for operatively connecting a motor "M" to the intermediate element 30. The motor "M" preferably is controlled by a controller "P", as will be described. Preferably, the ring element assembly 56 includes a ring element 10 (FIG. 6A). In one embodiment, the ring element 10 is secured to the intermediate element 30, for transmitting rotational motion to the intermediate element 30 for rotation of the intermediate element 30 about the intermediate element axis 32. However, as will be described, in an alternative embodiment, the ring element 10 may be formed integrally with the intermediate element 30. For example, the intermediate element 30 illustrated in FIGS. 6A and 6B is integrally formed with the ring element 10. In FIG. 6A, an external limit of the intermediate element is represented by the dashed line identified by reference character 11. It will be understood that the line 11 is aligned with the outer surfaces 60, 62 of the first and second workpieces 22, 24 when the intermediate element 30 is coaxial with the first and second workpieces 22, 24 (FIG. 6B).

It will be understood that, as noted above, in use, the intermediate element 30 of FIG. 6A is positioned between the first and second workpieces 22, 24. The location of the intermediate element 30 between the workpieces 22, 24 can be seen in FIG. 6B. It will also be understood that the heated portions of the intermediate element 30 and the first and second workpieces 22, 24 are heated to the predetermined hot working temperature, as described above. (The heating elements and the non-oxidizing atmosphere are omitted from FIG. 6B for clarity of illustration.)

Preferably, with the ring element assembly 56, the intermediate element 30 is rotated about the intermediate element axis 32. As illustrated in FIGS. 1-3 and as described above, the first heating element 50 is energized, to heat the first end 42 and the first length portion 2 to the predetermined hot working temperature, and to heat the first contact surface 34 and the first intermediate element portion 6 to the predetermined hot working temperature. The second heating element 52 is also energized, to heat the second end 44 and a second length portion 4 to the predetermined hot working temperature, and to heat the second contact surface 36 and the second intermediate element portion 8 to the predetermined hot working temperature. The first and second heating elements 50, 52 are then removed from the respective first and second gaps 46, 48. As noted above, while the intermediate element 30 is rotating about the intermediate element axis 32, and while the first end, the first length portion, the first contact surface, the first intermediate element portion, the second end, the second length portion, the second contact surface, and the second intermediate element portion are at the predetermined working temperature, the first end 42 is engaged with the first contact surface 34, to at least partially plastically deform the first end, the first length portion, the first contact surface, and the first intermediate element portion. It is also preferred that, at the same time or at substantially the same time, the second end 44 is engaged with the second contact surface 36 to at least partially plastically deform the second end, the second length portion, the second contact surface, and the second intermediate element portion.

As noted above, in an alternative embodiment, rotation of the intermediate element 30 may begin after the first and second ends 42, 44 are engaged with the first and second contact surfaces 34, 36 respectively.

As a result, on one side of the intermediate element 30, (i) the first end 42 and the first length portion 2, and (ii) the first contact surface 34 and the first intermediate element portion 6 are fused together, as described above. Similarly, on the other side of the intermediate element 30, (i) the second end 44 and the second length portion 4, and (ii) the second contact surface 36 and the second intermediate element portion 8 are fused together, as described above. In summary, the first and second workpieces 22, 24 and the intermediate element 30 are fused together to form the workpiece assembly 25 (FIG. 3). As noted above, it is also preferred that, once the workpiece assembly 25 is formed, it is cooled to an ambient temperature.

As can be seen in FIGS. 6A and 6B, in one embodiment, the ring element 10 is formed integrally with the intermediate element 30, and the ring element 10 preferably extends radially outwardly from the intermediate element 30 (FIGS. 6A, 6B).

As can be seen in FIG. 6B, once the workpiece assembly 25 is formed, it may be desirable to remove, or to partially remove, the ring element 10, so that the ring element does not extend radially outwardly relative to the outer surfaces 60, 62. Accordingly, in one embodiment, the ring element 10 preferably is subjected to one or more finishing processes after the workpiece assembly 25 is formed, to at least partially remove the ring element 10. Those skilled in the art would be aware of suitable finishing processes.

It will be understood that rollers and motors are omitted from FIG. 6B, to simplify the illustration.

In one embodiment, the ring element 10 extends radially outwardly from the intermediate element 30, and the ring element 10 preferably includes a breakaway zone 64 between an inner portion 65 of the ring element 10 that is located proximal to the intermediate element 30 and a peripheral ring 15 thereof that extends radially outwardly from the breakaway zone 64 (FIG. 6A). Preferably, the breakaway zone 64 is configured for failure in shear upon at least partial fusion of the first end 42 and the first contact surface 34, and upon at least partial fusion of the second end 44 and the second contact surface 36.

Those skilled in the art would appreciate that the breakaway zone 64 may be formed in various ways. As noted above, and as illustrated in FIG. 6A, the inner portion 65 may be integrally formed with the intermediate element 30. In one embodiment, illustrated in FIG. 6A, the ring element 10 preferably includes a number of small holes 16 that are sized and distributed to weaken the ring element 10 to the appropriate extent.

It will be understood that the breakaway zone 64 preferably is sufficiently strong that the breakaway zone 64 connects the inner portion 65, and the peripheral ring 15 while the intermediate element 30 is rotatable, i.e., because the heated portions are at the hot working temperature, and therefore are plastically deformable. However, the breakaway zone 64 is also sufficiently weak that, once the material in the previously heated portions is no longer plastically deformable, the greater shear stress to which the breakaway zone 64 is consequently subjected causes the breakaway zone 64 to break, or rupture.

It will also be understood that, once the breakaway zone 64 has failed or ruptured, the peripheral ring 15 is separated therefrom and from the inner portion 65, and the remainder of the ring element 10 that is still mounted on the intermediate element 30 at that point may be removed by any suitable finishing process.

The motor "M" and the controller "P" are schematically represented in FIG. 6A. The controller "P" preferably controls the motor "M". Those skilled in the art would appreciate that the controller "P" may be itself controlled via a variety of methods to stop the motor(s) once further rotation of the intermediate element is not feasible, as will be described.

Accordingly, the motor "M" is energized to rotate the intermediate element 30 upon the controller "P" providing the appropriate signal, and the motor "M" is de-energized upon the controller "P" providing a signal to de-energize. As noted above, upon engagement of the first and second workpieces with the intermediate element while the heated portions are at the hot working temperature, the heated portions are subjected to plastic deformation, involving shearing of the material in the heated portions. The temperature of the heated portions rapidly falls while the material in the heated portions is plastically deformed, and once the temperature is below the hot working temperature, the heated portions have at least partially recrystallized and further plastic deformation is not feasible. The motor "M" accordingly encounters significantly increased resistance at that point, and the torque applied by the motor "M" is significantly increased. It will be understood that the motor may be de-energized at that point. Those skilled in the art would be aware of devices and techniques (e.g., variable frequency drive control methods) that may be used to control motor torque. The controller "P" utilizes such devices and methods to determine when the motor "M" is to be de-energized due to a sudden, sharp increase in torque.

Depending on the circumstances, it may be advantageous to proceed with the process of rupturing the breakaway zone 64 after the material that has been plastically deformed has cooled. For example, the motor(s) may be de-energized initially, once significant resistance to rotation is encountered, indicating that further plastic deformation is not feasible at that point. Once the plastically deformed material has cooled, the motor(s) may be energized again to cause the ring element 10 to rotate further, forcing the breakaway zone 64 to rupture completely, causing the peripheral ring 15 to be separated from the breakaway zone and the inner portion 65.

It will be understood that the ring element assembly 56 may include various connecting devices for transmitting rotational movement from the motor "M" to the ring element 10. In one embodiment, for example, one or more motors "M" may rotate rollers "R" that engage an outer perimeter "Q" of the ring element 10 (FIG. 6A). As an example, two rollers "R" are shown in FIG. 6A, however, any suitable number of rollers may be used. Only one motor "M" is illustrated in FIG. 6A, to simplify the illustration.

The one or more motors "M" cause the rollers "R" to rotate about their respective axes, and the rollers "R" in turn cause the intermediate element 30 to rotate about its axis 32. The elements operatively connecting the motors to the rollers are omitted for clarity of illustration.

As an example, the rollers "R" are rotated about their respective axes in the directions indicated by arrows "X", and such rotation in turn causes the ring element 10 and consequently also the intermediate element 30 to rotate about the intermediate element axis in the direction indicated by arrow "Y" in FIG. 6A. It will be understood that elements connecting the one or more motors "M" with the rollers "R" are omitted from FIG. 6A for clarity of illustration.

Figure 7A:
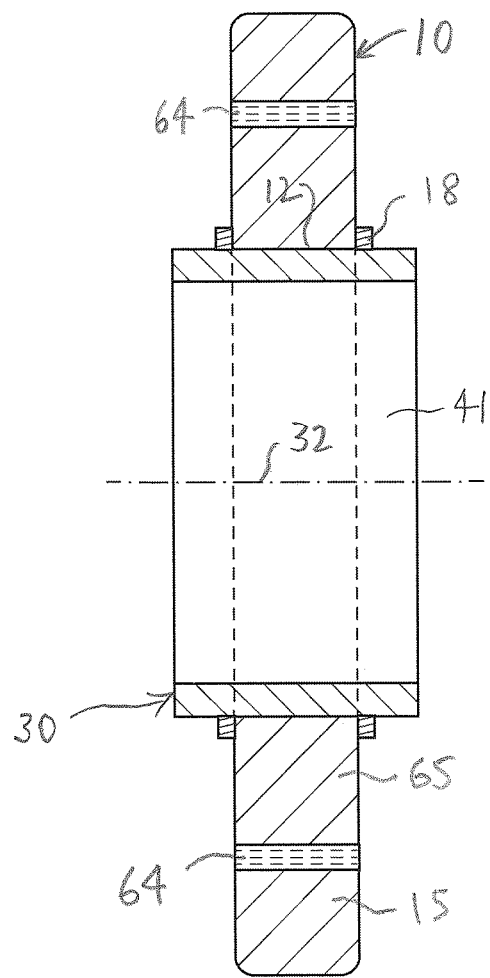
FIG. 7A is a cross-section of the intermediate element and another embodiment of the ring element assembly.

In another alternative embodiment, the ring element 10 preferably is releasably securable to the external surface 12 of the intermediate element 30 by one or more clamps 18, as will be described (FIG. 7A). In the embodiment illustrated in FIG. 7A, the ring element 10 is not integrally formed with the intermediate element 30.

As can be seen in FIG. 7A, instead of the ring element 10 being integrally formed with the intermediate element 30, the ring element 10 may be mounted to an external surface 12 of the intermediate element 30, and secured thereto by clamps. The ring element 10 illustrated in FIG. 7A includes the inner portion 65, the peripheral ring 15, and the breakaway zone 64 positioned therebetween. It will be understood that, when the breakaway zone 64 ruptures, the peripheral ring 15 may then be removed, and discarded or recycled. The inner portion 65 may be removed when the clamps 18 are released.

Figure 7B:
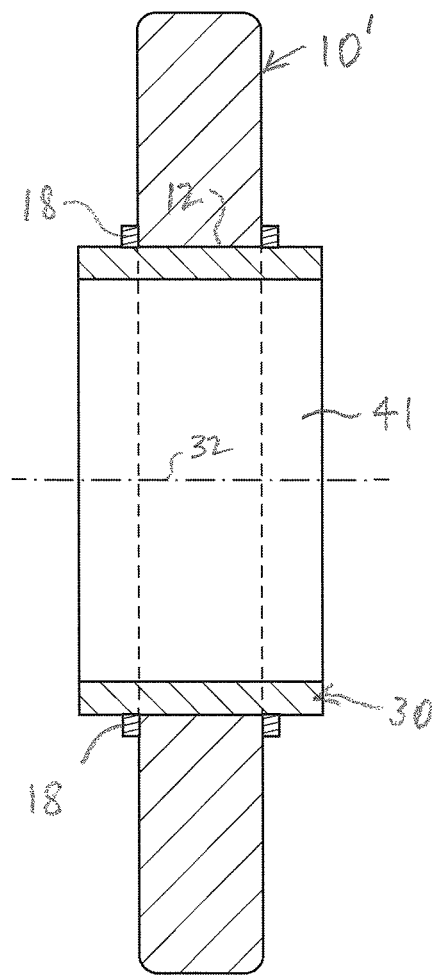
FIG. 7B is a cross-section of another embodiment of the intermediate element and the ring element assembly.
Figure 7C:
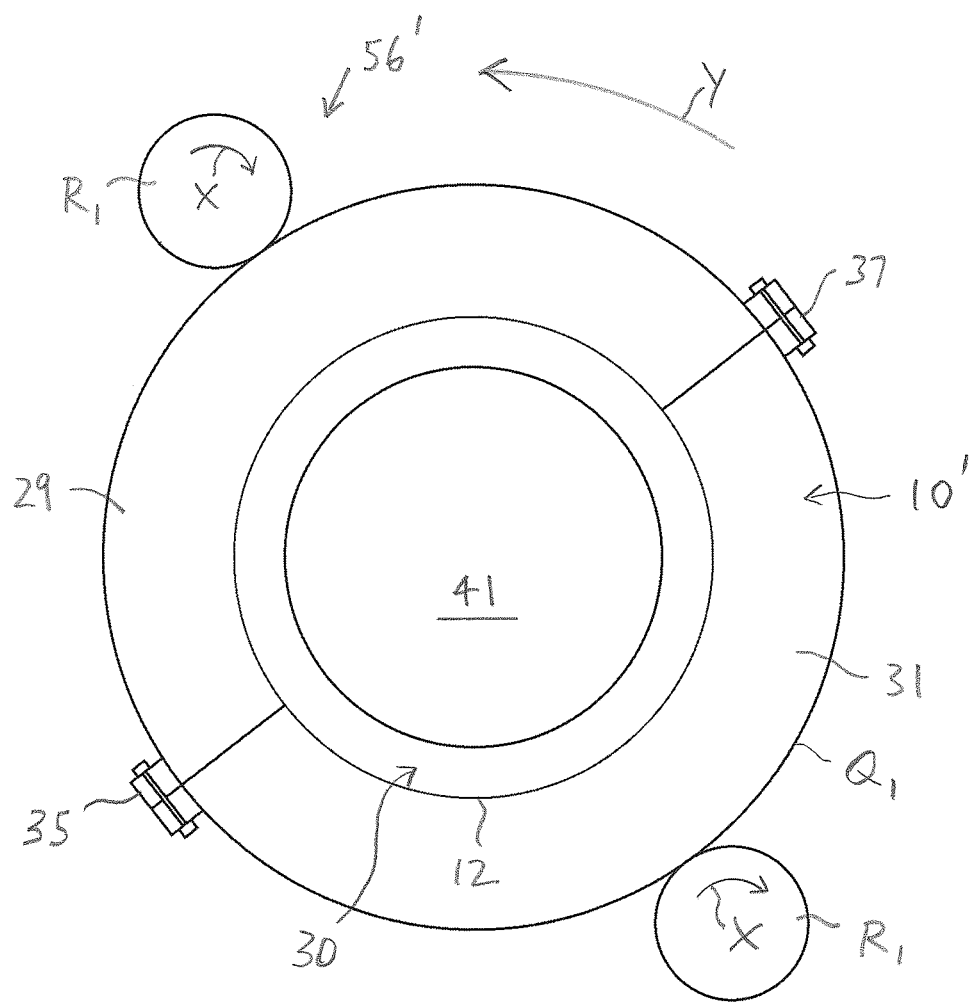
FIG. 7C is an end view of another embodiment of the intermediate element and the ring element assembly of the invention.

In an alternative embodiment of the ring element 10' illustrated in FIGS. 7B and 7C, the ring element 10' includes two body portions 29, 31 that fit together to form the ring element body 33. The ring element 10' preferably includes securing devices 35, 37 that secure the body portions 29, 31 to each other. Preferably, as shown in FIG. 7B, the ring element body 33 is secured to the external surface 12 of the intermediate element 30 by the clamps 18.

A ring element assembly 56' includes the ring element 10' (FIG. 7C). As can be seen in FIG. 7C, the ring element assembly 56' preferably includes any suitable devices for rotating the ring element 10', e.g., rollers "$R_1$", driven by one or more motors "M" (not shown in FIG. 7C). The intermediate element 30 is rotated as a result. It will be understood that the one or more motors are controlled by the controller "P" (not shown in FIG. 7C) so that, when the heated portions have cooled to a temperature below the hot working temperature and further plastic deformation thereof is not feasible, the motors cease urging rotation of the ring element 10'. It will be understood that the ring element 10' may be secured to the external surface 12 by clamps (not shown).

As an example, the rollers "R 1" may be rotated in the directions indicated by arrows "X" in FIG. 7C, and this causes the ring element 10' to rotate in the direction indicated by arrow "Y".

As illustrated in FIG. 7C, the securing devices 35, 37 project outwardly from an outer perimeter "$Q_1$" of the assembled ring element 10'. It will be understood that the securing devices 35, 37 may be formed so that they do not project outwardly from the outer perimeter "$Q_1$". It will also be understood that, as the intermediate element may be rotated less than 180°, the securing devices 35, 37 may in some cases extend outwardly beyond the outer perimeter "$Q_1$".

Once the workpiece assembly is formed, the ring element assembly 56' may be removed. The securing devices 35, 37 preferably are removed, to permit removal of the body portions 29, 31 separately from the external surface 12. It will be understood that the ring element 10' may subsequently be re-assembled, on another intermediate element 30.

Figure 7D:
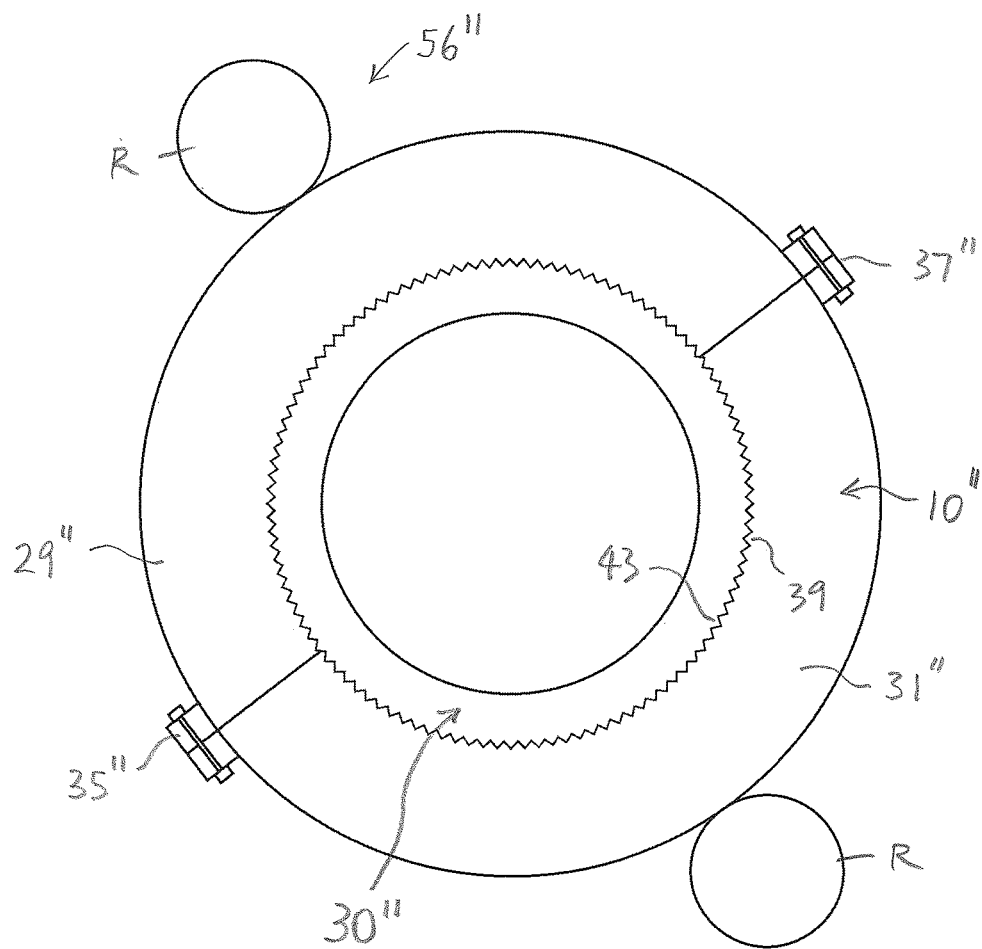
FIG. 7D is an end view of another alternative embodiment of the intermediate element and the ring element assembly of the invention.

An alternative embodiment of the ring element assembly 56", and an alternative embodiment of the intermediate element 30', are illustrated in FIG. 7D. The ring element assembly 56" is similar to the ring element assembly 56' of FIG. 7C, except that the ring element 10", when assembled, has teeth 39 that meshingly engage with similar teeth 43 of the intermediate element 30". From the foregoing, it can be seen that, the ability of the ring element 10" to cause the intermediate element 30" to rotate is enhanced by the engagement of the teeth 39 of the ring element 10" with the teeth 43.

The ring element 10" includes portions 29", 31" that fit together, and may be held together by the securing devices 35", 37". It will be understood that the ring element 10" may also be secured to the ring element's external surface by clamps (not shown).

Figure 6C:
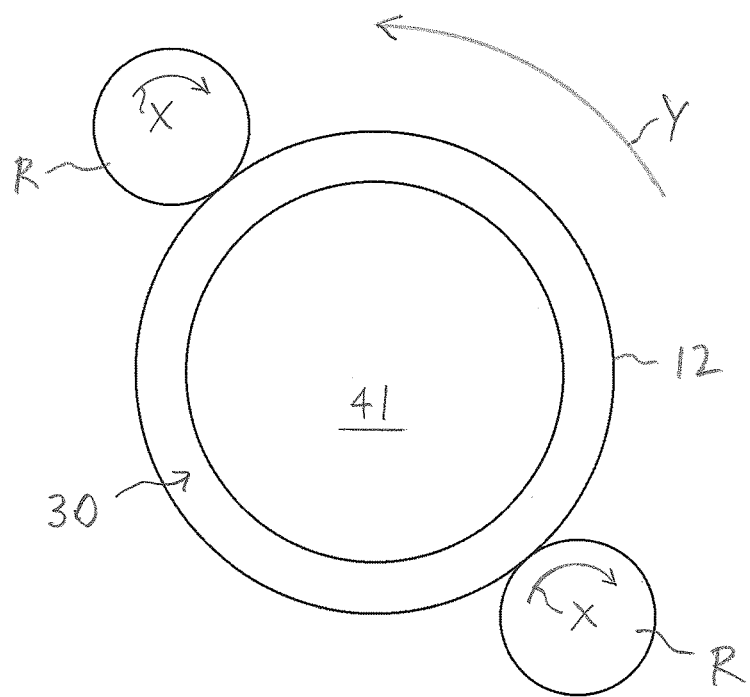
FIG. 6C is an end view of the intermediate element and an embodiment of the ring element assembly of the invention.

In another alternative embodiment, rollers "R" engage the external surface 12 of the intermediate element 30 directly, to rotate the intermediate element 30 about its axis (FIG. 6C). It will be understood that the rollers "R" are driven by one or more motors controlled by a controller (not shown in FIG. 6C). For example, the rollers "R" may be rotated in the directions indicated by arrows "X", to rotate the intermediate element 30 in the direction indicated by arrow "Y". Those skilled in the art would appreciate that, after the workpiece assembly has been formed, the rollers "R" preferably are disengaged and moved to another intermediate element, for use in forming another workpiece assembly.

In one embodiment, the invention also includes a system 19 for forming the workpiece assembly 25. The system 19 preferably includes one or more support elements 21, for supporting the first workpiece 22 and the second workpiece 24 in respective preselected positions relative to each other to locate the first and second ends 42, 44 facing each other and spaced apart from each other, to define the opening between the first and second ends 42, 44. Preferably, the support element 21 additionally supports the intermediate element 30, in the opening 45. The support element 21 locates the intermediate element 30 between the first and second ends 42, 44 to define the first and second gaps 46, 48 respectively between the first end 42 and the first contact surface 34, and between the second end 44 and the second contact surface 36 (FIG. 1).

In one embodiment, the system 19 preferably also includes the ring element assembly 56 and the motor "M", as described above. It is also preferred that the system 19 includes first and second heating elements 50, 52, positionable in the first and second gaps 46, 48 respectively, and the cover 55, for containing the non-oxidizing or inert atmosphere (FIGS. 1, 2).

As noted above, in one embodiment, the ring element assembly 56 preferably includes one or more clamps 18 for releasably securing the ring element 10 to the intermediate element 30 (FIGS. 7A, 7B). The clamps 18 may be any suitable clamps that may releasably secure the ring element 10 to the intermediate element 30. For example, the clamps 18 may be attached to fasteners (not shown) mounted in the external surface 12, to temporarily secure the ring element 10 to the intermediate element 30.

As described above, once the material in the heated portions is cooled below its hot working temperature, the rotation of the intermediate element 30 is stopped. As noted above, the rotation of the intermediate element 30 may be controlled in various ways. For example, in one embodiment, it is preferred that rotation is stopped as soon as sensors (not shown) determine that the torque required to rotate the intermediate element 30 is greater than a predetermined limit. The limit is reached when the temperature of the heated material is less than the hot working temperature, and resistance to further plastic deformation rapidly increases.

Once the intermediate element's rotation has been stopped, the fasteners holding the clamps 18 in place are removed, and the ring element 10 may be removed from the intermediate element 30.

As noted above, in an alternative embodiment, the ring element 10 may include the breakaway zone 64. The breakaway zone 64 is configured for failure in shear upon at least partial fusion of the first end 42 and the first contact surface 34 with each other, and also upon at least partial fusion of the second end 44 and the second contact surface 36 with each other.

Figure 8:
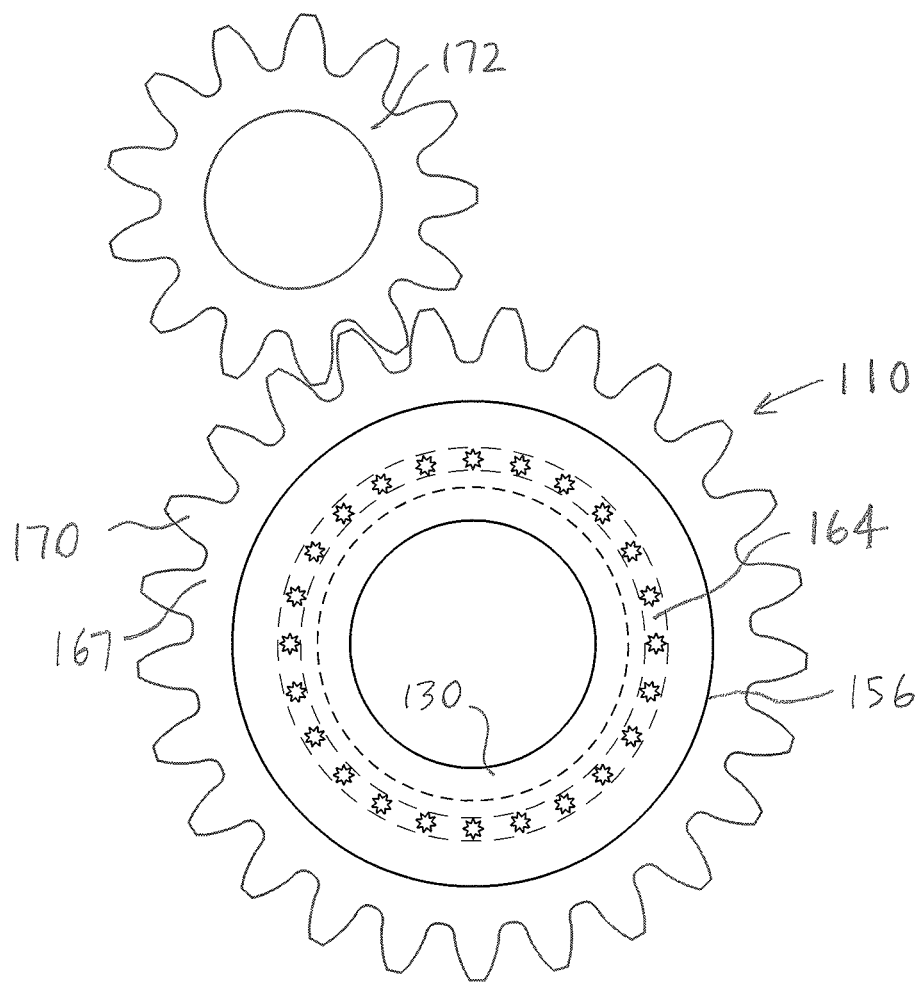
FIG. 8 is an end view of an alternative embodiment of the intermediate element and the ring element assembly of the invention.

In an alternative embodiment illustrated in FIG. 8, a ring element assembly 156 may include teeth 170 formed on an outer edge 167 of the ring element 110, for meshable engagement with one or more driving gears 172. The ring element 110 is integrally formed with an intermediate element 130. It will be understood that the driving gear 172 is driven by a motor (not shown in FIG. 8). In this embodiment, once ring element 110 fails along a zone of weakness 164, it is preferred that a controller (not shown in FIG. 8) stops the motor, thereby stopping rotation of the driving gear 172 at that time.

Figure 9:
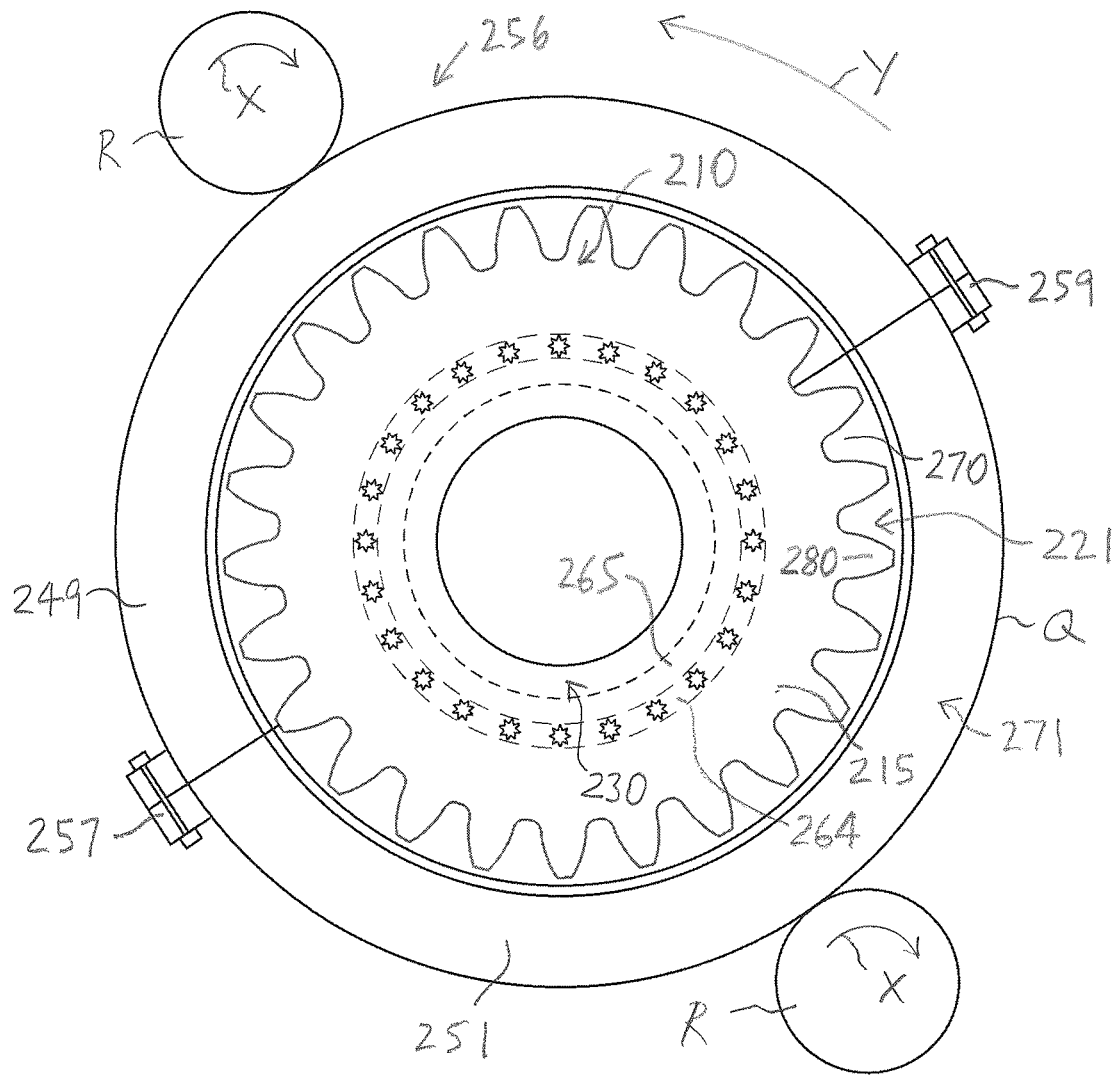
FIG. 9 is a side view of another embodiment of the intermediate element and the ring element assembly of the invention.

Another alternative embodiment of the ring element 210 is illustrated in FIG. 9. In this embodiment, teeth 270 of a gear 221 preferably are mounted to a support ring 271 of the ring element assembly 256 that is secured to the intermediate element 230. The ring element 210 includes an inner portion 265, a peripheral ring 215, and the breakaway zone 264 therebetween. The ring element 210 also includes teeth 280 that are mounted to the peripheral ring 215 (FIG. 9). It will be understood that the teeth 270 are formed so that inner surfaces 273 thereof may be meshably engaged with the teeth 280 of a ring element 210 that is mounted for rotation about the intermediate element axis. As illustrated in FIG. 9, the ring element 210 is integrally formed with an intermediate element 230. However, as noted above, in an alternative embodiment (not shown in FIG. 9), the ring element 210 may be formed separately from the intermediate element, and mounted to an external surface thereof.

In one embodiment, the support ring 271 preferably is formed of two or more portions 249, 251 that are secured together by securing devices 257, 259 (FIG. 9). The ring element assembly 256 preferably includes suitable devices, e.g., rollers "R", for causing the ring element 210 to rotate about the intermediate element's axis. It will be understood that one or more motors (not shown) preferably are operably connected with the rollers "R", and that the motors are controlled by a controller (not shown), as described above. The rollers "R" engage a peripheral surface "Q" of the support ring 271. In the example illustrated, rotation of the rollers "R" in the direction indicated by arrows "X" causes the ring element 271 to rotate in the direction indicated by arrow "Y", which in turn causes the intermediate element 230 to rotate in the same direction due to the engagement of the teeth 270 with the teeth 280. Preferably, the intermediate element 230 is rotated for plastic deformation of the heated portions, and the breakaway zone 264 ruptures when further plastic deformation of the heated portions is not feasible, as described above.

Next, the rollers "R" preferably are disengaged from the support ring 271, and the support ring 271 preferably is removed. To remove the support ring 271, the securing devices 257, 259 are released, and the two portions 249, 251 preferably are then separated from each other. The ring element 271 may be re-used at another intermediate element.

Because the breakaway zone 264 has ruptured, the peripheral ring 215 may then be removed. The inner portion 265 and such parts of the breakaway zone 264 as are attached to it may be subjected to suitable finishing processes.

Figure 10A:
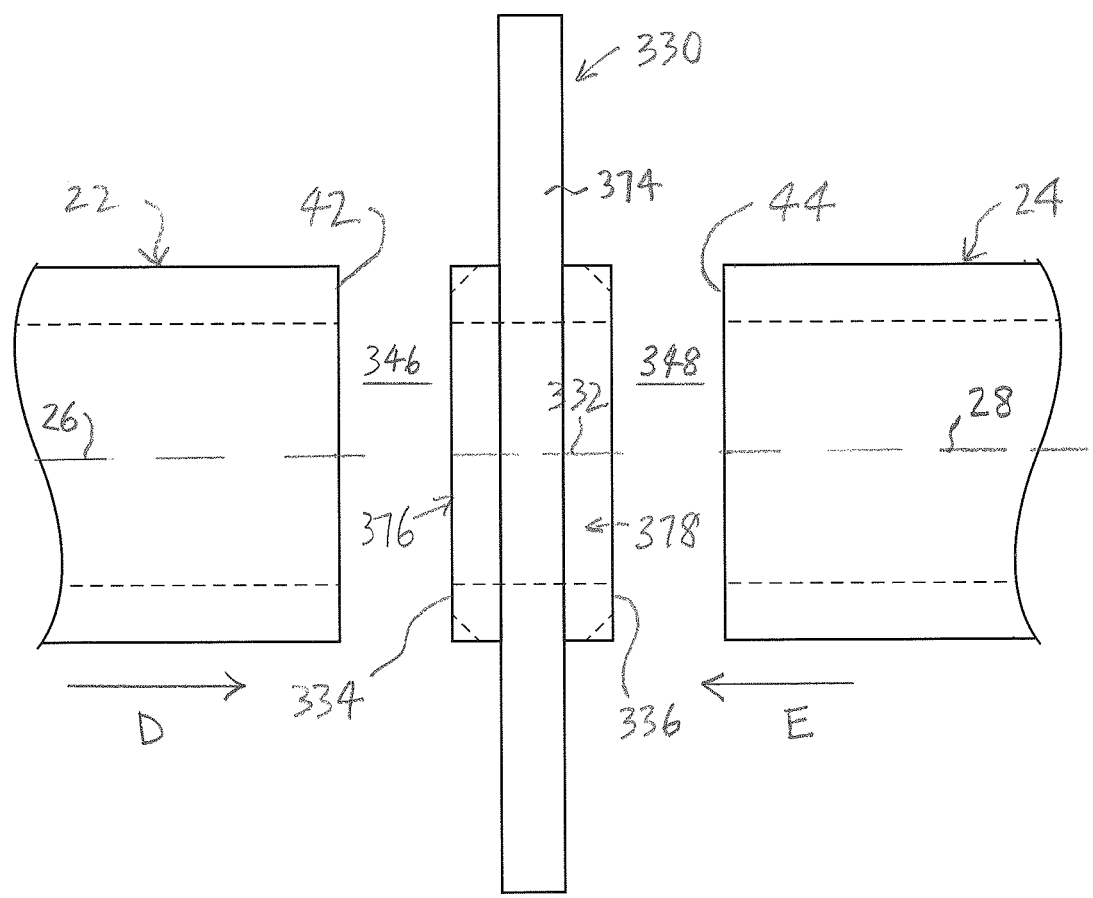
FIG. 10A is a side view of another alternative embodiment of the intermediate element of the invention, positioned between ends of workpieces, drawn at a smaller scale.
Figure 10B:
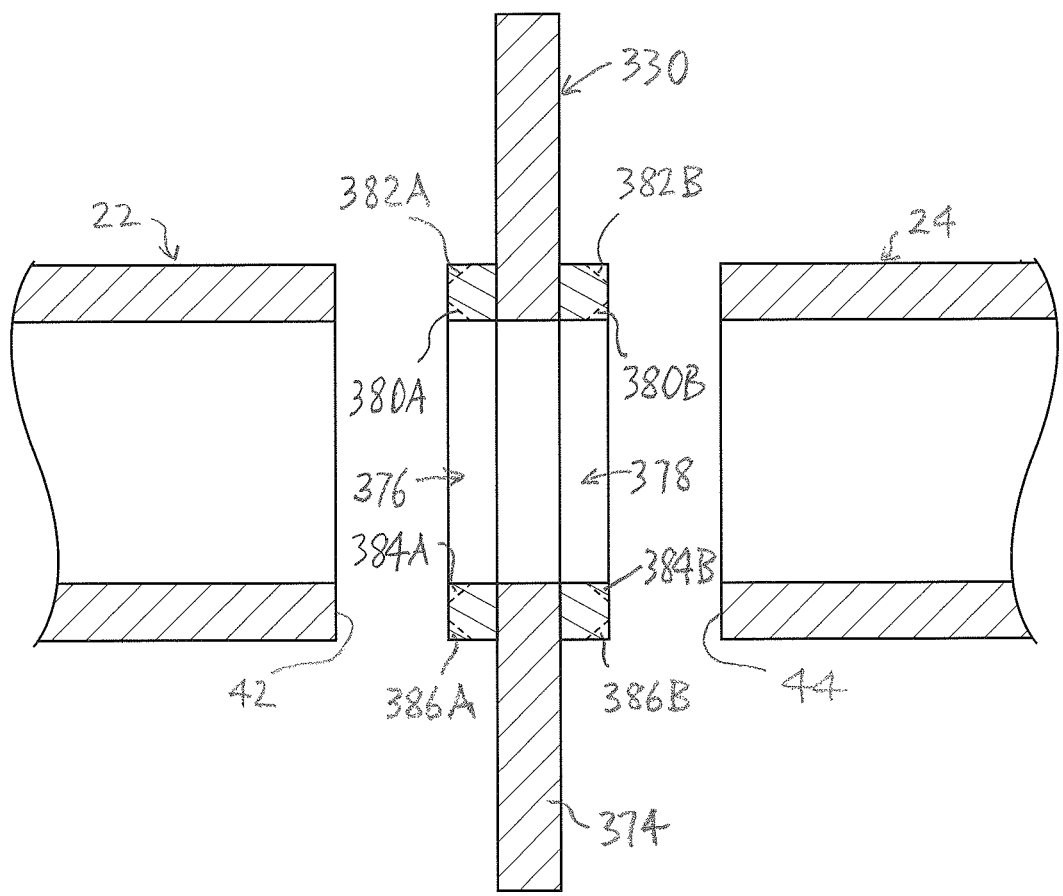
FIG. 10B is a cross-section of the intermediate element and the workpieces of FIG. 10A.

An alternative embodiment of the intermediate element 330 of the invention is illustrated in FIGS. 10A and 10B. Preferably, the intermediate element 330 includes a plate body 374 and first and second ring elements 376, 378 mounted on opposite sides of the plate body 374. The first and second ring elements 376, 378 preferably include first and second contact surfaces 334, 336 for engagement with the first and second ends 42, 44 of the first and second workpieces 22, 24 respectively. The first and second ring elements 376, 378 are formed to modify distribution of heat throughout the intermediate element 330, to ensure that the heated portions of the intermediate element and the first and second workpieces are heated to approximately the same predetermined hot working temperature at substantially the same time.

It will be understood that not all of the heated portions are illustrated in FIGS. 10A and 10B, for clarity of illustration.

Preferably, the intermediate element 330 defines an intermediate element axis 332. The first and second workpieces 22, 24 define the respective axes 26, 28. It is preferred that the intermediate element 330 and the first and second workpieces 22, 24 are located coaxial with each other.

As can be seen in FIGS. 10A and 10B, a first gap 346 is defined between the first contact surface 334 and the first end 42, and a second gap 348 is defined between the second contact surface 336 and the second end 44. It will be understood that heating elements (not shown in FIGS. 10A and 10B) are positioned in the first and second gaps 346, 348. It will also be understood that the first contact surface 334 and the first end 42, and the second contact surface 336 and the second end 44, are heated in non-oxidizing atmospheres (not shown in FIGS. 10A and 10B) to the predetermined working temperatures by the energized heating elements. As described above, it is preferred that when the first and second contact surfaces 334, 336 and the first and second ends 42, 44 and other heated portions related thereto are heated to the predetermined working temperature, they may be subjected to plastic deformation.

It will be understood that heating elements and the non-oxidizing atmosphere are omitted from FIGS. 10A and 10B for clarity of illustration. The intermediate element 330 preferably is rotatable about the intermediate element axis 332, using any suitable means to rotate the intermediate element 330.

In one embodiment, once the heating elements are removed, and while the intermediate element 330 is rotated about the intermediate element axis 332, the first and second workpieces 22, 24 preferably are moved in the directions indicated by arrows "D" and "E" in FIG. 10A, so that the first and second ends 42, 44 engage the first and second contact surfaces 334, 336 respectively. Upon engagement, the first and second ends 42, 44 and the first and second contact surfaces 334, 336 and other heated portions related thereto are plastically deformed, and subsequently, upon plastic deformation ceasing, the intermediate element 330 ceases to rotate about its axis 332.

In one embodiment, the first and second ring elements 376, 378 preferably include bevelled corners. For instance, the first and second ring elements 376, 378 may include respective inner diameter bevelled corners 380A, 380B (FIG. 10B). In addition, or in the alternative, the first and second ring elements 376, 378 may include respective outer diameter bevelled corners 382A, 382B.

As can be seen in FIG. 10B, the inner diameter bevelled corners 380A, 380B partially define inner diameter grooves 384A, 384B. The outer diameter bevelled corners 382A, 382B partially define outer diameter grooves 386A, 386B. It will be understood that the bevelled corners are not shown as being removed in FIG. 10B for clarity of illustration.

It will also be understood that, to the extent that the materials in the first and second ring elements 376, 378 and other heated portions flow when subjected to plastic deformation, such materials may flow into the inner diameter grooves 384A, 384B and/or the outer diameter grooves 386A, 386B. As a result, the inner diameter of the fused workpiece assembly (i.e., the intermediate element 330, fused with the first and second ends 42, 44 of the first and second workpieces 22, 24) is more smooth than it otherwise would have been. Similarly, the outer surface of the fused workpiece assembly is more smooth than it otherwise would have been.

Figure 10C:
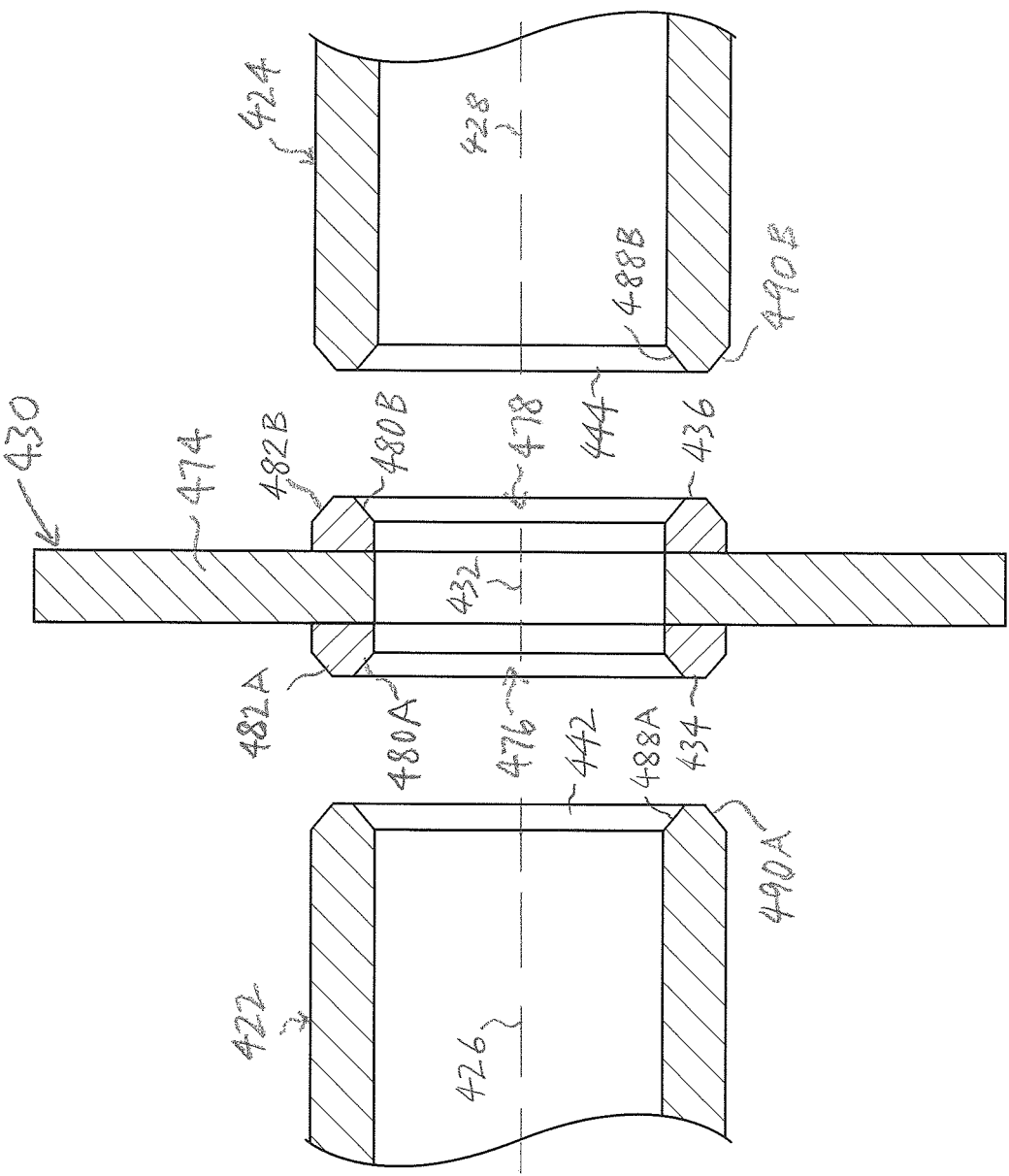
FIG. 10D is a cross-section of the intermediate element and the workpieces of FIG. 100, fused together.

In FIG. 10C, an embodiment of the intermediate element 430 is illustrated, located between first and second ends 442, 444 of the first and second workpieces 422, 424. The intermediate element 430 includes a plate body 474 on which first and second ring elements 476, 478 are formed. Preferably, the first and second ring elements 476, 478 include first and second contact surfaces 434, 436, and also include inner bevelled corners 480A, 480B and outer bevelled corners 482A, 482B.

As can be seen in FIG. 10O, it is also preferred that the first and second ends 442, 444 include inner bevelled corners 488A, 488B and outer bevelled corners 490A, 490B. Preferably, the intermediate element 430 is positioned between the first and second ends 442, 444 so that the first contact surface 434 faces the first end 442, and the second contact surface 436 faces the second end 444. The first and second workpieces 422, 424 are partially defined by respective axes 426, 428 thereof. The intermediate element 430 is also partially defined by a intermediate element axis 432 about which the intermediate element 430 is rotatable.

In the same manner generally as outlined above, the intermediate element 430 preferably is positioned so that it is coaxial with the first and second workpieces 422, 424. It will be understood that heating elements are omitted for clarity of illustration. However, as outlined above, the first and second ends 442, 444 and the first and second ring elements 476, 478 and other heated portions related thereto preferably are heated in a non-oxidizing atmosphere to a predetermined hot working temperature by heating elements (not shown), at which point the heating elements are removed.

Figure 10D:
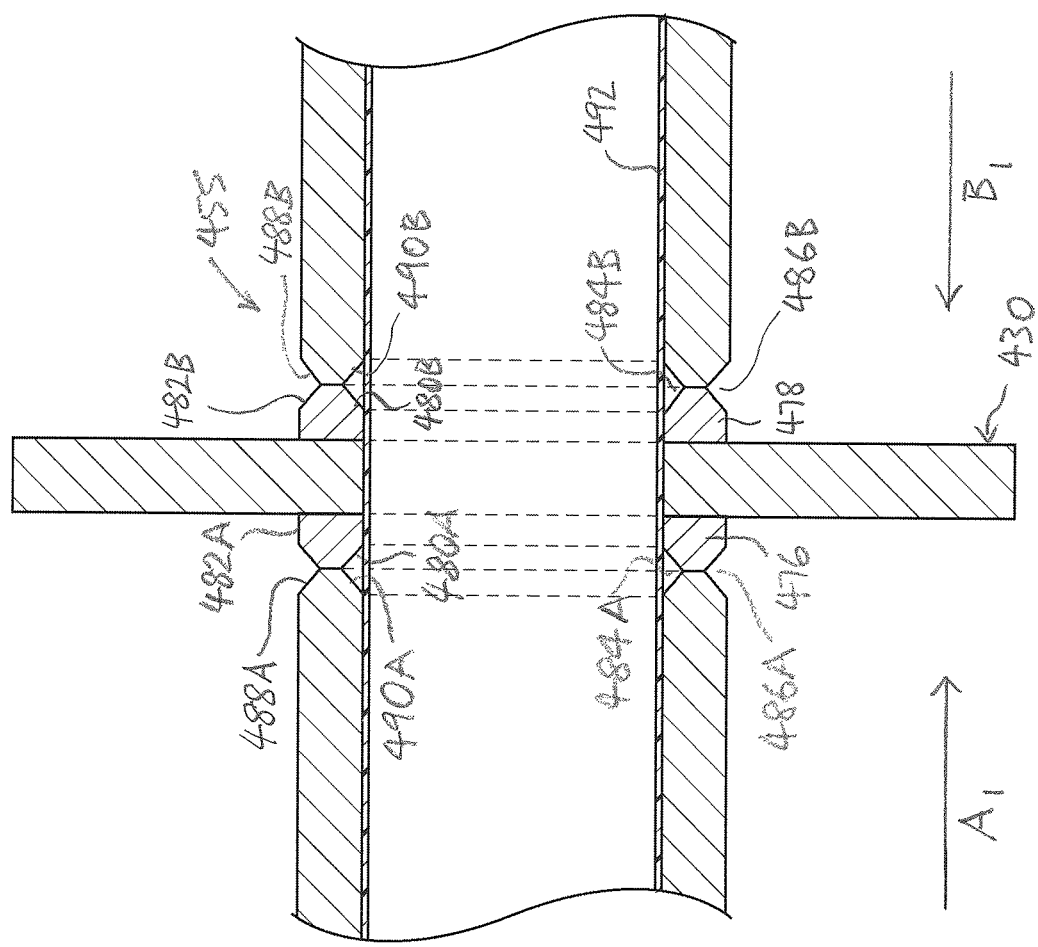

It is also preferred that, while the intermediate element 430 is rotated about the intermediate element axis 432, and while the first and second ends 442, 444 and the first and second ring elements 476, 478 and other heated portions related thereto are at the predetermined hot working temperature, the first and second workpieces 422, 424 are moved in the directions indicated by arrows "$A_1$" and "$B_1$", to engage the first and second ends 442, 444 with the first and second contact surfaces 434, 436 (FIG. 10D).

As can be seen in FIG. 10D, when the first and second workpieces 422, 424 are moved to engage the intermediate element 430, inner diameter grooves 484A, 484B are formed, as are outer diameter grooves 486A, 486B. As an example, the inner diameter groove 484A is defined in part by the inner bevelled corner 488A on the first ring element 476, and also by the inner bevelled corner 488A on the first end 442. Similarly, the inner diameter groove 484B is defined in part by the inner bevelled corner 488B on the second end 444, and also by the inner bevelled corner 480B on the second ring element 478. The first and second ends 442, 444 are fused with the first and second ring elements 476, 478 respectively, to form a fused workpiece assembly 425 (FIG. 10D).

Those skilled in the art would appreciate that a cladding 492 may be applied around the inner diameter of the fused workpiece assembly 425. As can be seen in FIG. 10D, part of the cladding 492 may be located in the inner grooves 484A, 484B, to provide a consistently smooth surface along the inner diameter of the fused workpiece assembly 425.

The outer diameter groove 486A is defined by outer bevelled corners 482A, 490A, and the outer diameter groove 486B is defined by outer bevelled corners 482B, 490B.

As can be seen in FIG. 10D, when the bevelled corners are formed, the cladding 492 may be undercut slightly. For example, the cladding 492 may be undercut with respect to the inner groove 484B (FIG. 10D). The cladding 492 preferably has a melting temperature, and a hot working temperature, that are higher than those of the first and second workpieces 422, 424 and the intermediate element 430. Accordingly, parts of the heated material of the first and second workpieces 422, 424 and the intermediate element 430 may flow into the inner grooves 484A, 484B, and the cladding 492 covers such material, providing a smooth inner diameter of the fused workpiece assembly 425.

It will be understood that the heating elements may be located in any suitable position relative to the intermediate element and the first and second ends of the first and second workpieces. As a practical matter, if the inner diameters of the workpieces are sufficiently large, the heating elements may be located inside the first and second ends, and also inside the intermediate element. In this configuration, once the heating elements have heated the first and second ends and the first and second contact regions of the intermediate element to the predetermined working temperature, the heating elements may be withdrawn horizontally.

Figure 11A:
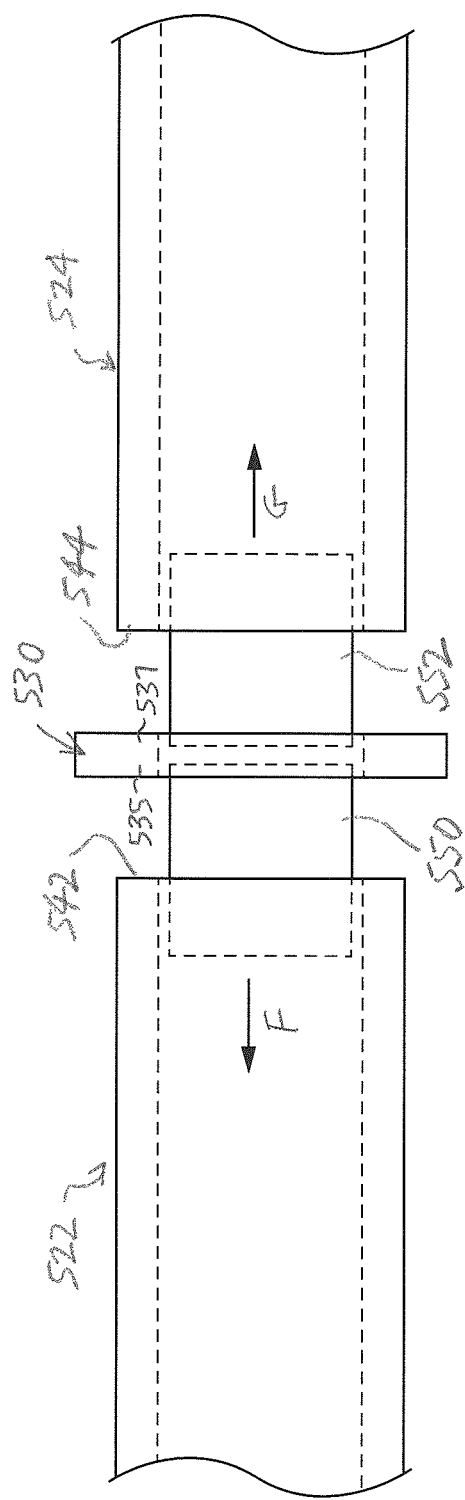
FIG. 11A is a side view of the workpieces and the intermediate element of the invention with alternative embodiments of the heating elements positioned therein, drawn at a smaller scale.

An example of this configuration is illustrated in FIG. 11A. As can be seen in FIG. 11A, heating elements 550, 552 are located partially in each of the first and second ends 542, 544 of the first and second workpieces 522, 524. The heating elements 550, 552 are also each partially located in the intermediate element 530 as well. It will be understood that a non-oxidizing atmosphere is present, but omitted from FIG. 11A for clarity of illustration. Once the first and second contact regions 535, 537 and the first and second ends 542, 544 and other heated portions related thereto have been heated to the predetermined working temperature, the heating elements 550, 552 are removed, by moving them in the directions indicated by arrows "F" and "G" respectively.

Figure 11B:
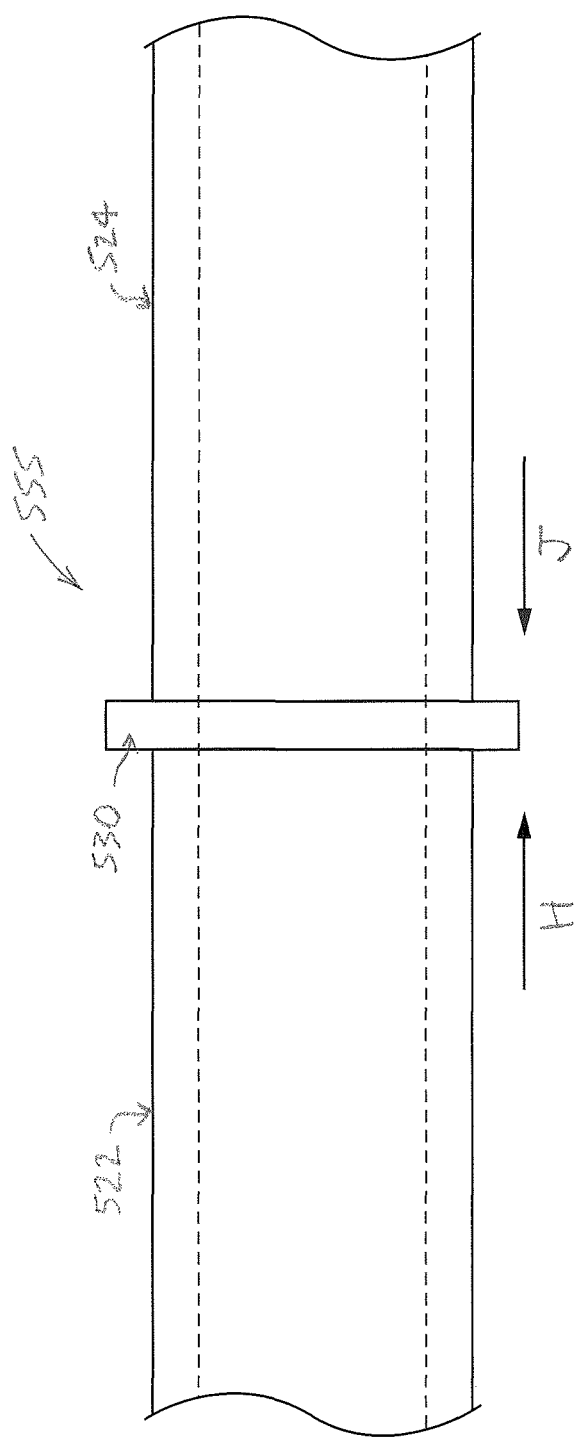
FIG. 11B is a side view of the workpieces and the intermediate element of FIG. 11A in which the workpieces and the intermediate element are fused together.

In the same manner as described above, the intermediate element 530 preferably is rotated about its axis (not shown in FIG. 11A). While the intermediate element 530 is rotating, and also while all of the first and second ends 542, 544 and the first and second contact regions 535, 537 and other heated portions related thereto are at the predetermined working temperature, the first and second workpieces 522, 524 are moved as indicated by arrows "H" and "J" in FIG. 11B, so that first and second ends 542, 544 are engaged with the intermediate element 530, and the first and second ends 542, 544 and the first and second contact regions 535, 537 are plastically deformed as a result. Once plastic deformation ceases, the intermediate element's rotation is ceased, and the intermediate element and the first and second workpieces are fused together to form the fused workpiece assembly 525 (FIG. 11B).

Those skilled in the art would appreciate that the sequence in which certain steps of the embodiments of the method of the invention are performed may be varied without materially affecting the results produced by such embodiments.

It will also be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

I claim:

1. A method of forming a workpiece assembly (25), the method comprising:
   (a) providing a first metal workpiece (22) defining a first longitudinal axis (26) thereof, the first workpiece having a first end (42) thereof
   (b) providing a second metal workpiece (24) defining a second longitudinal axis (28) thereof, the second workpiece having a second end (44) thereof;
   (c) positioning the first and second workpieces coaxially to locate the first and second ends facing each other and spaced apart from each other to define an opening between the first and second ends (42, 44);
   (d) providing an intermediate element (30) defining an intermediate element axis (32) thereof, the intermediate element (30) having first and second contact surfaces (34, 36) on opposed first and second sides (38, 40) thereof respectively;
   (e) positioning the intermediate element (30) in the opening (42, 44) to position the first and second contact surfaces (34, 36) facing the first and second ends (42, 44) respectively, to define first and second gaps (46, 48) therebetween respectively, the intermediate element (30) being located coaxial with the first and second workpieces (22, 24);
   (f) providing a ring element assembly (56) for operatively connecting at least one motor to the intermediate element, the ring element assembly comprising a ring element (10) that is integrally formed with the intermediate element (30), the ring element extending radially outwardly from the intermediate element (30), for transmitting rotational motion to the intermediate element for rotation of the intermediate element about the intermediate element axis, the ring element (10) comprising a breakaway zone (64) between an inner portion (65) of the ring element (10) that is located proximal to the intermediate element (30) and a peripheral ring (15) thereof that extends radially outwardly from the breakaway zone (64), the breakaway zone (64) being configured for failure in shear upon at least partial fusion of the first end (42) and the first contact surface (34), and upon at least partial fusion of the second end (44) and the second contact surface (36);
   (g) positioning at least one first heating element (50) and at least one second heating element (52) in the first and second gaps (46, 48) respectively;
   (h) providing at least one non-oxidizing atmosphere covering the first and second ends (42, 44) and the first and second sides (38, 40) of the intermediate element (30);
   (i) with the ring element (10), rotating the intermediate element (30) about the intermediate element axis (32);
   (j) energizing said at least one first heating element (50), to heat the first end (42) and a first length portion (2) extending from the first end (42) into the first workpiece (22) to a predetermined hot working temperature, at which the first end (42) and the first length portion (2) are plastically deformable, and to heat the first contact surface (34) and a first intermediate element portion (6) extending from the first contact surface (34) into the intermediate element (30) to the predetermined hot working temperature, at which the first contact surface (34) and the first intermediate element portion (6) are plastically deformable;
   (k) energizing said at least one second heating element (52), to heat the second end (44) and a second length portion (4) extending from the second end (44) into the second workpiece (24) to the predetermined hot working temperature, at which the second end (44) and the second length portion (4) are plastically deformable, and to heat the second contact surface (36) and a second intermediate element portion (8) extending from the second contact surface (36) into the intermediate element (30) to the predetermined hot working temperature, at which the second contact surface (36) and the second intermediate element portion (8) are plastically deformable;
   (l) removing the first and second heating elements (50, 52) from the respective first and second gaps (46, 48);
   while the intermediate element (30) is rotating about the intermediate element axis (32), and while the first end (42), the first length portion (2), the first contact surface (34), the first intermediate element portion (6), the second end (44), the second length portion (4), the second contact surface (36), and the second intermediate element portion (8) are at the predetermined working temperature, engaging the first end (42) with the first contact surface (34), to at least partially plastically deform the first end (42), the first length portion (2), the first contact surface (34), and the first intermediate element portion (6), and engaging the second end (44) with the second contact surface (36) to at least partially plastically deform the second end (44), the second length portion (4), the second contact surface (36), and the second intermediate element portion (8), wherein the first end (42) and the first length portion (2), and the first contact surface (34) and the first intermediate element portion (6) are fused together, and wherein the second end (44) and the second length portion (4) and the second contact surface (36) and the second intermediate element portion (8) are fused together, to form the workpiece assembly (25), and wherein the peripheral ring (15) is removable after failure of the breakaway zone (64).

2. The method according to claim 1 additionally comprising subjecting the ring element (10) to at least one finishing process after the workpiece assembly (25) is formed, to at least partially remove the ring element (10).

3. The method according to claim 1 in which the ring element assembly (156) comprises a plurality of teeth (170) formed on an outer edge (167) of the ring element (110), for meshable engagement with a driving gear (172) that is driven by the motor, for rotating the intermediate element (30) about the intermediate element axis (32).

4. The method according to claim 1 in which the ring element assembly (256) additionally comprises:
 a support ring (271) comprising a gear (221) with a plurality of teeth (270);
 the ring element (210) including a plurality of teeth (280) that are mounted to the peripheral ring (215) for meshable engagement thereof with the teeth (270) of the support ring (271); and
 a peripheral surface (Q) of the support ring (271) is engaged with at least one roller (R) driven by said at least one motor, for rotation of the ring element assembly (256) about the intermediate element axis (32).

5. The method according to claim 4 in which the support ring (271) is formed of at least two portions (249, 251) that are secured together by securing devices (257, 259), to hold the teeth (270) of the gear (221) in meshable engagement with the teeth (280) on the peripheral ring (215).

6. The method according to claim 5 in which, after the failure of the breakaway zone (264) and the securing devices (257, 259) are released, the support ring (271) is removable from the peripheral ring (215).

7. A method of forming a workpiece assembly (25), the method comprising:
 (a) providing a first metal workpiece (22) defining a first longitudinal axis (26) thereof, the first workpiece having a first end (42) thereof;
 (b) providing a second metal workpiece (24) defining a second longitudinal axis (28) thereof, the second workpiece having a second end (44) thereof;
 (c) positioning the first and second workpieces coaxially to locate the first and second ends facing each other and spaced apart from each other to define an opening between the first and second ends (42, 44);
 (d) providing an intermediate element (30) defining an intermediate element axis (32) thereof, the intermediate element (30) having first and second contact surfaces (34, 36) on opposed first and second sides (38, 40) thereof respectively;
 (e) positioning the intermediate element (30) in the opening (42, 44) to position the first and second contact surfaces (34, 36) facing the first and second ends (42, 44) respectively, to define first and second gaps (46, 48) therebetween respectively, the intermediate element (30) being located coaxial with the first and second workpieces (22, 24);
 (f) providing a ring element assembly (56) for operatively connecting at least one motor to the intermediate element, the ring element assembly comprising a ring element (10) that is securable to an external surface (12) of the intermediate element (30) by clamps (18), the ring element extending radially outwardly from the intermediate element (30), for transmitting rotational motion to the intermediate element for rotation of the intermediate element about the intermediate element axis, the ring element (10) comprising a breakaway zone (64) between an inner portion (65) of the ring element (10) that is located proximal to the intermediate element (30) and a peripheral ring (15) thereof that extends radially outwardly from the breakaway zone (64), the breakaway zone (64) being configured for failure in shear upon at least partial fusion of the first end (42) and the first contact surface (34), and upon at least partial fusion of the second end (44) and the second contact surface (36);
 (g) positioning at least one first heating element (50) and at least one second heating element (52) in the first and second gaps (46, 48) respectively;
 (h) providing at least one non-oxidizing atmosphere covering the first and second ends (42, 44) and the first and second sides (38, 40) of the intermediate element (30);
 (i) with the ring element (10), rotating the intermediate element (30) about the intermediate element axis (32);
 (j) energizing said at least one first heating element (50), to heat the first end (42) and a first length portion (2) extending from the first end (42) into the first workpiece (22) to a predetermined hot working temperature, at which the first end (42) and the first length portion (2) are plastically deformable, and to heat the first contact surface (34) and a first intermediate element portion (6) extending from the first contact surface (34) into the intermediate element (30) to the predetermined hot working temperature, at which the first contact surface (34) and the first intermediate element portion (6) are plastically deformable;
 (k) energizing said at least one second heating element (52), to heat the second end (44) and a second length portion (4) extending from the second end (44) into the second workpiece (24) to the predetermined hot working temperature, at which the second end (44) and the second length portion (4) are plastically deformable, and to heat the second contact surface (36) and a second intermediate element portion (8) extending from the second contact surface (36) into the intermediate element (30) to the predetermined hot working temperature, at which the second contact surface (36) and the second intermediate element portion (8) are plastically deformable;
 (l) removing the first and second heating elements (50, 52) from the respective first and second gaps (46, 48);
 while the intermediate element (30) is rotating about the intermediate element axis (32), and while the first end (42), the first length portion (2), the first contact surface (34), the first intermediate element portion (6), the second end (44), the second length portion (4), the second contact surface (36), and the second intermediate element portion (8) are at the predetermined working temperature, engaging the first end (42) with the first contact surface (34), to at least partially plastically deform the first end (42), the first length portion (2), the first contact surface (34), and the first intermediate element portion (6), and engaging the second end (44) with the second contact surface (36) to at least partially plastically deform the second end (44), the second length portion (4), the second contact surface (36), and the second intermediate element portion (8), wherein the first end (42) and the first length portion (2), and the first contact surface (34) and the first intermediate element portion (6) are fused together, and wherein the second end (44) and the second length portion (4) and the second contact surface (36) and the second intermediate element portion (8) are fused together, to form the workpiece assembly (25), and wherein the peripheral ring (15) is removable after failure of the breakaway zone (64).

8. A method of forming a workpiece assembly (25), the method comprising:
   (a) providing a first metal workpiece (22) defining a first longitudinal axis (26) thereof, the first workpiece having a first end (42) thereof;
   (b) providing a second metal workpiece (24) defining a second longitudinal axis (28) thereof, the second workpiece having a second end (44) thereof;
   (c) positioning the first and second workpieces coaxially to locate the first and second ends facing each other and spaced apart from each other to define an opening between the first and second ends (42, 44);
   (d) providing an intermediate element (30) defining an intermediate element axis (32) thereof, the intermediate element (30) having first and second contact surfaces (34, 36) on opposed first and second sides (38, 40) thereof respectively;
   (e) positioning the intermediate element (30) in the opening (42, 44) to position the first and second contact surfaces (34, 36) facing the first and second ends (42, 44) respectively, to define first and second gaps (46, 48) therebetween respectively, the intermediate element (30) being located coaxial with the first and second workpieces (22, 24);
   (f) providing a ring element assembly (56') for operatively connecting at least one motor to the intermediate element, the ring element assembly (56') comprising a ring element (10') comprising body portions (29, 31) that fit together to form a ring element body (33) engageable with an external surface (12) of the intermediate element (30), the ring element (10') being securable to the external surface (12) of the intermediate element (30) by clamps (18), the ring element (10') extending radially outwardly from the intermediate element (30), for transmitting rotational motion to the intermediate element (30) for rotation of the intermediate element (30) about the intermediate element axis (32);
   (g) positioning at least one first heating element (50) and at least one second heating element (52) in the first and second gaps (46, 48) respectively;
   (h) providing at least one non-oxidizing atmosphere covering the first and second ends (42, 44) and the first and second sides (38, 40) of the intermediate element (30);
   (i) with the ring element (10), rotating the intermediate element (30) about the intermediate element axis (32);
   (j) energizing said at least one first heating element (50), to heat the first end (42) and a first length portion (2) extending from the first end (42) into the first workpiece (22) to a predetermined hot working temperature, at which the first end (42) and the first length portion (2) are plastically deformable, and to heat the first contact surface (34) and a first intermediate element portion (6) extending from the first contact surface (34) into the intermediate element (30) to the predetermined hot working temperature, at which the first contact surface (34) and the first intermediate element portion (6) are plastically deformable;
   (k) energizing said at least one second heating element (52), to heat the second end (44) and a second length portion (4) extending from the second end (44) into the second workpiece (24) to the predetermined hot working temperature, at which the second end (44) and the second length portion (4) are plastically deformable, and to heat the second contact surface (36) and a second intermediate element portion (8) extending from the second contact surface (36) into the intermediate element (30) to the predetermined hot working temperature, at which the second contact surface (36) and the second intermediate element portion (8) are plastically deformable;
   (l) removing the first and second heating elements (50, 52) from the respective first and second gaps (46, 48);
   while the intermediate element (30) is rotating about the intermediate element axis (32), and while the first end (42), the first length portion (2), the first contact surface (34), the first intermediate element portion (6), the second end (44), the second length portion (4), the second contact surface (36), and the second intermediate element portion (8) are at the predetermined working temperature, engaging the first end (42) with the first contact surface (34), to at least partially plastically deform the first end (42), the first length portion (2), the first contact surface (34), and the first intermediate element portion (6), and engaging the second end (44) with the second contact surface (36) to at least partially plastically deform the second end (44), the second length portion (4), the second contact surface (36), and the second intermediate element portion (8),
   wherein the first end (42) and the first length portion (2), and the first contact surface (34) and the first intermediate element portion (6) are fused together, and wherein the second end (44) and the second length portion (4) and the second contact surface (36) and the second intermediate element portion (8) are fused together, to form the workpiece assembly (25),
   and wherein the ring element (10') is removable from the intermediate element (30) upon formation of the workpiece assembly (25).

9. The method according to claim 8 in which the ring element (10") comprises a plurality of teeth (39) meshably engaged with a plurality of intermediate body teeth (43) on the external surface of the intermediate element (30"), to secure the ring element (10") to the intermediate element (30") for rotation of the intermediate element (30") about the intermediate element axis (32).

* * * * *